(12) United States Patent
Shibata

(10) Patent No.: US 10,594,146 B2
(45) Date of Patent: Mar. 17, 2020

(54) BATTERY CONTROL CIRCUIT FOR MULTIPLE CELLS EMPLOYING LEVEL SHIFT CIRCUITS TO AVOID FAULT

(71) Applicant: Kohei Shibata, Tokyo (JP)

(72) Inventor: Kohei Shibata, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 65 days.

(21) Appl. No.: 15/689,329

(22) Filed: Aug. 29, 2017

(65) Prior Publication Data

US 2018/0076638 A1 Mar. 15, 2018

(30) Foreign Application Priority Data

Sep. 13, 2016 (JP) ................................. 2016-178656

(51) Int. Cl.
*H02J 7/00* (2006.01)

(52) U.S. Cl.
CPC ......... *H02J 7/0036* (2013.01); *H02J 7/00302* (2020.01)

(58) Field of Classification Search
CPC .................................................. H02J 7/0036
USPC ....................................................... 320/118
See application file for complete search history.

(56) References Cited

U.S. PATENT DOCUMENTS

| 5,530,336 | A | * | 6/1996 | Eguchi | ................. | H02J 7/0013 |
| | | | | | | 320/118 |
| 5,581,170 | A | * | 12/1996 | Mammano | ............ | H02J 7/0019 |
| | | | | | | 320/116 |
| 5,869,950 | A | * | 2/1999 | Hoffman, Jr. | ............ | B60K 6/28 |
| | | | | | | 320/103 |
| 6,018,227 | A | * | 1/2000 | Kumar | .............. | H01M 10/4257 |
| | | | | | | 320/106 |
| 6,094,031 | A | * | 7/2000 | Shimane | ............. | B60L 11/1855 |
| | | | | | | 320/118 |
| 6,297,618 | B2 | * | 10/2001 | Emori | .............. | G01R 19/16542 |
| | | | | | | 320/132 |

(Continued)

FOREIGN PATENT DOCUMENTS

| JP | H07-105986 | | 4/1995 | | |
| JP | 11055865 | A | * | 2/1999 | |
| JP | 2017083303 | A | * | 5/2017 | ......... G01R 31/3648 |

*Primary Examiner* — Robert Grant
*Assistant Examiner* — John T Trischler
(74) *Attorney, Agent, or Firm* — IPUSA, PLLC

(57) ABSTRACT

A battery control circuit that is used for a battery protecting apparatus configured to protect a secondary battery in which cells are connected in series includes: a level shift circuit configured to shift respective levels of cell voltages of the cells to generate level shift voltages; a maximum voltage output circuit including differential amplifier circuits for the respective level shift voltages, the respective differential amplifier circuits being configured to compare the corresponding level shift voltages with threshold voltages to generate output voltages, the maximum voltage output circuit being configured to simultaneously compare the output voltages to output a maximum voltage corresponding to a cell voltage whose voltage value is highest; an overcharge detecting circuit configured to detect overcharging of the secondary battery based on the maximum voltage; and a maximum voltage cell specifying circuit configured to specify, based on the output voltages, a cell whose voltage value is highest.

13 Claims, 9 Drawing Sheets

(56) References Cited

U.S. PATENT DOCUMENTS

| | | | | |
|---|---|---|---|---|
| 6,377,024 B1* | 4/2002 | Choy | H02J 7/0018 | 320/116 |
| 6,992,463 B2* | 1/2006 | Yoshio | H02J 7/0031 | 320/134 |
| 7,253,589 B1* | 8/2007 | Potanin | H02J 7/0055 | 307/80 |
| 7,282,890 B2* | 10/2007 | Adachi | G01R 31/3658 | 320/116 |
| 7,352,155 B2* | 4/2008 | Li | G01R 31/362 | 320/118 |
| 7,400,114 B2* | 7/2008 | Anzawa | B60L 11/18 | 320/118 |
| 7,564,217 B2* | 7/2009 | Tanigawa | H02J 7/0016 | 320/118 |
| 7,719,284 B2* | 5/2010 | Ohta | H02J 7/0021 | 324/434 |
| 7,759,903 B2* | 7/2010 | Kamata | G01R 31/3658 | 320/132 |
| 7,812,568 B2* | 10/2010 | Yonezawa | G01R 19/16542 | 320/116 |
| 8,063,643 B2* | 11/2011 | Deveau | G01R 31/3658 | 324/430 |
| 8,103,401 B2* | 1/2012 | Kubo | B60L 11/1855 | 320/116 |
| 8,159,184 B2* | 4/2012 | Emori | B60L 3/0046 | 307/10.1 |
| 8,212,571 B2* | 7/2012 | Emori | B60L 11/1855 | 320/118 |
| 8,350,528 B2* | 1/2013 | Yang | H02J 7/0016 | 320/103 |
| 8,401,728 B2* | 3/2013 | Kubo | B60L 11/1855 | 324/522 |
| 8,410,809 B2* | 4/2013 | Lee | G01R 19/16523 | 324/764.01 |
| 8,426,047 B2* | 4/2013 | Emori | H02J 7/0019 | 307/10.1 |
| 8,436,620 B2* | 5/2013 | Stirk | G01R 19/2503 | 324/426 |
| 8,462,005 B2* | 6/2013 | Kuroda | B60L 11/1864 | 340/636.1 |
| 8,508,279 B2* | 8/2013 | Ban | H02J 7/0021 | 327/121 |
| 8,558,516 B2* | 10/2013 | Takahashi | H02J 7/00 | 320/158 |
| 8,583,389 B2* | 11/2013 | Aoshima | B60L 3/0046 | 702/63 |
| 8,629,679 B2* | 1/2014 | Li | G01R 31/3658 | 320/118 |
| 8,649,935 B2* | 2/2014 | Kubo | B60L 11/1855 | 324/522 |
| 8,692,556 B2* | 4/2014 | Makihara | G01R 31/3658 | 320/116 |
| 8,779,727 B2* | 7/2014 | Akaho | H02J 7/045 | 320/141 |
| 8,786,289 B2* | 7/2014 | Sekiguchi | G01R 31/362 | 320/116 |
| 8,798,832 B2* | 8/2014 | Kawahara | H01M 10/441 | 701/22 |
| 8,836,341 B2* | 9/2014 | Inoue | G01R 31/025 | 324/433 |
| 8,947,052 B2* | 2/2015 | Nishizawa | H01M 10/441 | 320/134 |
| 9,008,902 B2* | 4/2015 | Kubo | B60L 11/1855 | 324/522 |
| 9,012,099 B2* | 4/2015 | Toth | H02J 7/0021 | 429/427 |
| 9,018,892 B2* | 4/2015 | Agarwal | H02J 7/0016 | 320/101 |
| 9,035,611 B2* | 5/2015 | Kikuchi | B60L 3/0046 | 320/116 |
| 9,130,379 B2* | 9/2015 | Sakabe | B60L 3/0046 | |
| 9,136,509 B2* | 9/2015 | Tam | H01M 2/0212 | |
| 9,184,600 B2* | 11/2015 | Maloizel | H02J 7/00 | |
| 9,203,248 B2* | 12/2015 | Ohkawa | B60L 3/0046 | |
| 9,209,630 B2* | 12/2015 | Naghshtabrizi | H02J 7/0016 | |
| 9,333,874 B2* | 5/2016 | Kubo | B60L 11/1855 | |
| 9,397,371 B2* | 7/2016 | Nishi | H01M 10/48 | |
| 9,450,274 B2* | 9/2016 | Vo | H01M 10/4257 | |
| 9,459,327 B2* | 10/2016 | Ishikawa | G01R 31/3658 | |
| 9,465,083 B2* | 10/2016 | Makihara | G01R 31/3658 | |
| 9,753,092 B2* | 9/2017 | Fujii | G01R 31/3658 | |
| 9,759,781 B2* | 9/2017 | Ohtake | G01R 31/3658 | |
| 9,837,837 B2* | 12/2017 | Wang | H02H 7/18 | |
| 9,966,768 B2* | 5/2018 | Sugimura | H02J 7/0021 | |
| 10,018,680 B2* | 7/2018 | Kikuchi | G01R 31/3658 | |
| 10,060,988 B2* | 8/2018 | Sekiguchi | G01R 31/3648 | |
| 10,074,997 B2* | 9/2018 | Vo | H01M 10/4257 | |
| 10,110,020 B2* | 10/2018 | Kawamoto | H02J 7/0016 | |
| 10,158,241 B2* | 12/2018 | Tanabe | H02H 3/20 | |
| 2001/0002100 A1* | 5/2001 | Compton | H01L 29/94 | 320/165 |
| 2001/0011881 A1* | 8/2001 | Emori | G01R 19/16542 | 320/116 |
| 2005/0083015 A1* | 4/2005 | Adachi | G01R 31/3658 | 320/116 |
| 2005/0140336 A1* | 6/2005 | Anzawa | B60L 11/18 | 320/118 |
| 2006/0103351 A1* | 5/2006 | Tanigawa | H02J 7/0016 | 320/118 |
| 2006/0132139 A1* | 6/2006 | Ohta | H02J 7/0021 | 324/426 |
| 2007/0285054 A1* | 12/2007 | Li | G01R 31/362 | 320/116 |
| 2007/0285083 A1* | 12/2007 | Kamata | G01R 31/362 | 324/120 |
| 2009/0085516 A1* | 4/2009 | Emori | B60L 3/0046 | 320/118 |
| 2009/0087722 A1* | 4/2009 | Sakabe | B60L 3/0046 | 429/61 |
| 2009/0091332 A1* | 4/2009 | Emori | B60L 11/1855 | 324/537 |
| 2009/0130541 A1* | 5/2009 | Emori | H02J 7/0019 | 429/61 |
| 2009/0198399 A1* | 8/2009 | Kubo | B60L 11/1855 | 701/22 |
| 2009/0224771 A1* | 9/2009 | Deveau | G01R 31/3658 | 324/600 |
| 2009/0289605 A1* | 11/2009 | Takahashi | H02J 7/00 | 320/163 |
| 2010/0185405 A1* | 7/2010 | Aoshima | B60L 3/0046 | 702/63 |
| 2010/0194339 A1* | 8/2010 | Yang | H02J 7/0016 | 320/116 |
| 2010/0237897 A1* | 9/2010 | Kikuta | H02M 3/33507 | 324/764.01 |
| 2010/0244885 A1* | 9/2010 | Lee | G01R 19/16523 | 324/764.01 |
| 2011/0074431 A1* | 3/2011 | Li | G01R 31/3658 | 324/426 |
| 2011/0075712 A1* | 3/2011 | Kuroda | B60L 11/1864 | 375/219 |
| 2011/0115436 A1* | 5/2011 | Zhang | B60L 11/1861 | 320/134 |
| 2011/0193413 A1* | 8/2011 | Kudo | H02J 7/0018 | 307/77 |
| 2011/0227542 A1* | 9/2011 | Akaho | H02J 7/045 | 320/145 |
| 2011/0260770 A1* | 10/2011 | Sekiguchi | G01R 31/362 | 327/333 |
| 2011/0313613 A1* | 12/2011 | Kawahara | H01M 10/441 | 701/34.4 |
| 2012/0025769 A1* | 2/2012 | Kikuchi | B60L 3/0046 | 320/118 |
| 2012/0056624 A1* | 3/2012 | Stirk | G01R 19/2503 | 324/433 |
| 2012/0081167 A1* | 4/2012 | Ban | H02J 7/0021 | 327/333 |

(56) References Cited

U.S. PATENT DOCUMENTS

| | | | | |
|---|---|---|---|---|
| 2012/0098547 A1* | 4/2012 | Inoue | G01R 31/025 | 324/537 |
| 2012/0133370 A1* | 5/2012 | Kubo | B60L 11/1855 | 324/433 |
| 2012/0135279 A1* | 5/2012 | Toth | H02J 7/0021 | 429/9 |
| 2012/0139545 A1* | 6/2012 | Makihara | G01R 31/362 | 324/426 |
| 2012/0175953 A1* | 7/2012 | Ohkawa | B60L 3/0046 | 307/18 |
| 2012/0206105 A1* | 8/2012 | Nishizawa | H01M 10/441 | 320/134 |
| 2012/0268057 A1* | 10/2012 | Wu | H01M 10/44 | 320/103 |
| 2012/0293129 A1* | 11/2012 | Naghshtabrizi | H02J 7/0016 | 320/118 |
| 2012/0299555 A1* | 11/2012 | Tam | H01M 2/0212 | 320/162 |
| 2013/0022844 A1* | 1/2013 | Ishikawa | G01R 31/3658 | 429/61 |
| 2013/0049673 A1* | 2/2013 | Agarwal | H02J 7/0016 | 320/101 |
| 2013/0088157 A1* | 4/2013 | Noda | G05F 3/24 | 315/173 |
| 2013/0110430 A1* | 5/2013 | Nishi | H01M 10/48 | 702/63 |
| 2013/0134943 A1* | 5/2013 | Maloizel | H02J 7/00 | 320/118 |
| 2013/0187659 A1* | 7/2013 | Kubo | B60L 11/1855 | 324/433 |
| 2013/0257381 A1* | 10/2013 | Diamond | B60L 11/1861 | 320/134 |
| 2014/0049222 A1* | 2/2014 | Moorhead | H02J 7/0016 | 320/134 |
| 2014/0088823 A1* | 3/2014 | Kubo | B60L 11/1855 | 701/34.4 |
| 2014/0176078 A1* | 6/2014 | Lai | H02J 7/0014 | 320/134 |
| 2014/0205865 A1* | 7/2014 | Matsuo | G01R 31/362 | 429/7 |
| 2014/0232346 A1* | 8/2014 | Zhang | B60L 11/1861 | 320/118 |
| 2014/0312828 A1* | 10/2014 | Vo | H01M 10/4257 | 320/103 |
| 2015/0035487 A1* | 2/2015 | Kawamoto | H02J 7/0016 | 320/112 |
| 2015/0077060 A1* | 3/2015 | Okuda | H02J 7/0019 | 320/121 |
| 2015/0191102 A1* | 7/2015 | Kubo | B60L 11/1855 | 701/34.4 |
| 2015/0241520 A1* | 8/2015 | Ohtake | G01R 31/3658 | 324/434 |
| 2015/0280469 A1* | 10/2015 | Wang | H02H 7/18 | 320/134 |
| 2015/0357856 A1* | 12/2015 | Tanabe | H02H 3/20 | 320/163 |
| 2016/0091572 A1* | 3/2016 | Fujii | G01R 31/3658 | 324/434 |
| 2016/0190832 A1* | 6/2016 | Sugimura | H02J 7/0021 | 320/116 |
| 2017/0018945 A1* | 1/2017 | Ohtake | G01R 31/3658 | |
| 2017/0054306 A1* | 2/2017 | Vo | H01M 10/4257 | |
| 2017/0123010 A1* | 5/2017 | Sekiguchi | G01R 31/3648 | |
| 2017/0302088 A1* | 10/2017 | Tkachenko | H02J 7/0045 | |
| 2017/0351561 A1* | 12/2017 | Yamazoe | H01M 10/42 | |
| 2018/0241226 A1* | 8/2018 | Sugimura | H02J 7/0021 | |

* cited by examiner

BATTERY CONTROL CIRCUIT FOR MULTIPLE CELLS EMPLOYING LEVEL SHIFT CIRCUITS TO AVOID FAULT

CROSS-REFERENCE TO RELATED APPLICATIONS

This patent application is based upon and claims the benefit of priority of Japanese Patent Application No. 2016-178656 filed on Sep. 13, 2016, the entire contents of which are incorporated herein by reference.

BACKGROUND OF THE INVENTION

1. Field of the Invention

The present disclosure relates to a battery control circuit.

2. Description of the Related Art

In order to prevent overcharging or over-discharging of a battery cell, a technique is known in the related art for outputting the maximum voltage or the minimum voltage among a plurality of voltages of a plurality of battery cells connected in series.

However, in the above technique, because it is difficult to identify which cell has the maximum or minimum cell voltage among the plurality of cells, it is difficult to accurately protect the secondary battery in which the plurality of cells are connected in series.

An object of one aspect of the present disclosure is to provide a battery control circuit that enables to accurately protect a secondary battery in which a plurality of cells are connected in series.

RELATED ART DOCUMENT

Patent Document

[Patent Document 1]: Japanese Laid-open Patent Publication No. H07-105986

SUMMARY OF THE INVENTION

In view of the above described object, according to the present disclosure, a battery control circuit that is used for a battery protecting apparatus configured to protect a secondary battery in which a plurality of cells are connected in series includes: a level shift circuit configured to shift respective levels of cell voltages of the plurality of cells to generate a plurality of level shift voltages; a maximum voltage output circuit including differential amplifier circuits for the plurality of respective level shift voltages, the respective differential amplifier circuits being configured to compare the plurality of corresponding level shift voltages with a plurality of threshold voltages to generate a plurality of output voltages, the maximum voltage output circuit being configured to simultaneously compare the plurality of output voltages to output a maximum voltage corresponding to a cell voltage whose voltage value is highest among the plurality of cell voltages; an overcharge detecting circuit configured to detect overcharging of the secondary battery based on the maximum voltage; and a maximum voltage cell specifying circuit configured to specify, based on the plurality of output voltages, a cell whose voltage value is highest among the plurality of cells.

In view of the above described object, according to the present disclosure, a battery control circuit that is used for a battery protecting apparatus configured to protect a secondary battery in which a plurality of cells are connected in series includes: a level shift circuit configured to shift respective levels of cell voltages of the plurality of cells to generate a plurality of level shift voltages; a minimum voltage output circuit including differential amplifier circuits for the plurality of respective level shift voltages, the respective differential amplifier circuits being configured to compare the plurality of corresponding level shift voltages with a plurality of threshold voltages to generate a plurality of output voltages, the minimum voltage output circuit being configured to simultaneously compare the plurality of output voltages to output a minimum voltage corresponding to a cell voltage whose voltage value is lowest among the plurality of cell voltages; an over-discharge detecting circuit configured to detect over-discharging of the secondary battery based on the minimum voltage; and a minimum voltage cell specifying circuit configured to specify, based on the plurality of output voltages, a cell whose voltage value is lowest among the plurality of cells.

In view of the above described object, according to the present disclosure, a battery control circuit that is used for a battery protecting apparatus configured to protect a secondary battery in which a plurality of cells are connected in series, the battery control circuit includes: a level shift circuit configured to shift respective levels of cell voltages of the plurality of cells to generate a plurality of level shift voltages; a maximum voltage output circuit including differential amplifier circuits for the plurality of respective level shift voltages, the respective differential amplifier circuits being configured to compare the plurality of corresponding level shift voltages with a plurality of threshold voltages to generate a plurality of first output voltages, the maximum voltage output circuit being configured to simultaneously compare the plurality of first output voltages to output a maximum voltage corresponding to a cell voltage whose voltage value is highest among the plurality of cell voltages; a maximum voltage cell specifying circuit configured to specify, based on the plurality of first output voltages, a cell whose voltage value is highest among the plurality of cells; and a minimum voltage output circuit including differential amplifier circuits for the plurality of respective level shift voltages, the respective differential amplifier circuits being configured to compare the plurality of corresponding level shift voltages with a plurality of threshold voltages to generate a plurality of second output voltages, the minimum voltage output circuit being configured to simultaneously compare the plurality of second output voltages to output a minimum voltage corresponding to a cell voltage whose voltage value is lowest among the plurality of cell voltages.

DETAILED DESCRIPTION OF THE PREFERRED EMBODIMENTS

In the following, embodiments of the present disclosure will be described with reference to the drawings.

Figure 1:
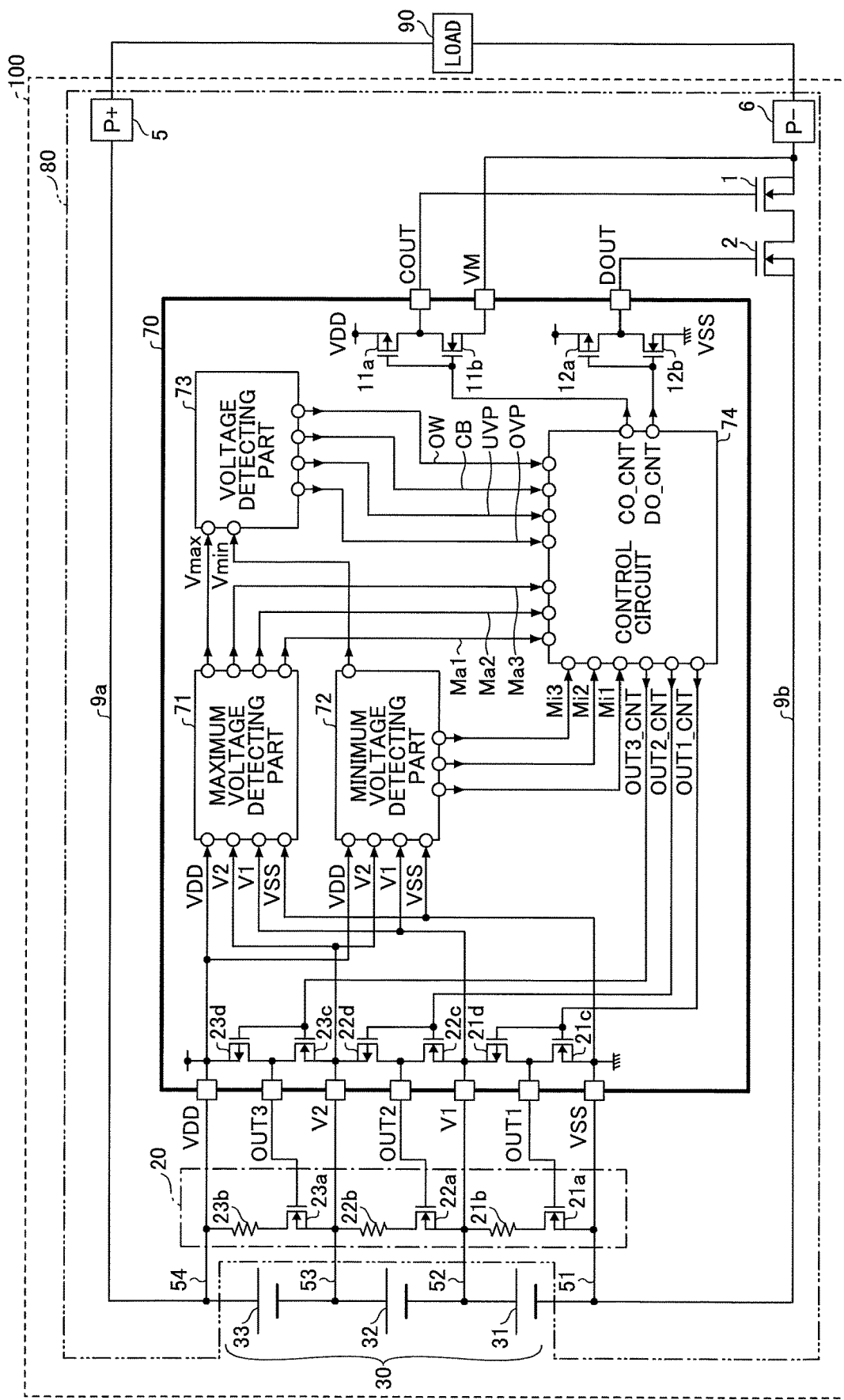
FIG. 1 is a diagram illustrating an example of a configuration of a battery pack.

FIG. 1 is a diagram illustrating an example of a configuration of a battery pack 100. The battery pack 100 illustrated in FIG. 1 includes a secondary battery 30 and a battery protecting apparatus 80 that are built in the battery pack 100.

The secondary battery 30 is an example of a chargeable/dischargeable battery. The secondary battery 30 can supply electric power to a load 90 connected to a plus terminal 5 (P+ terminal) and a minus terminal 6 (P− terminal). The secondary battery 30 can be charged by a charger (not illustrated) connected to the plus terminal 5 and the minus terminal 6. A lithium ion battery, a lithium polymer battery, etc., are specific examples of the secondary battery 30. The battery pack 100 may be built in or externally provided for the load 90.

The load 90 is an example of a load powered by the secondary battery 30 of the battery pack 100. An electronic device such as a portable terminal device may be a specific example of the load 90. Specific examples of the portable terminal device are electronic devices such as a mobile phone, a smart phone, a tablet computer, a game machine, a television, a music/video player, and a camera.

Figure 3:
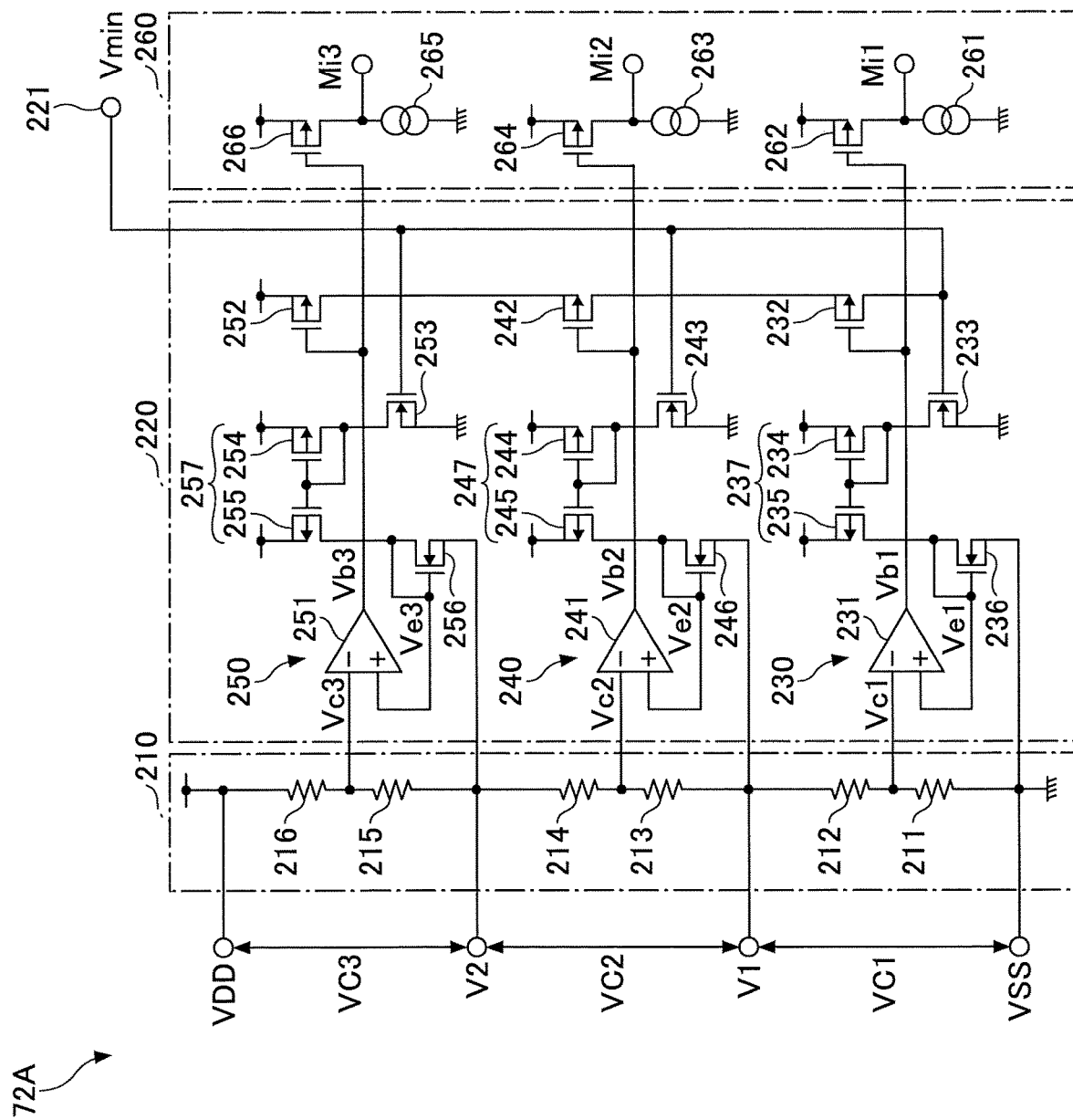
FIG. 3 is a diagram illustrating an example of a configuration of a minimum voltage detecting part.

The secondary battery 30 is configured to include a plurality of cells 31 to 33 that are connected in series. In the example of FIG. 3, the three cells 31 to 33 are illustrated. A positive electrode of the secondary battery 30 is connected to a positive electrode of the cell 33 whose electric potential is highest among the cells 31 to 33 constituting the secondary battery 30. A negative electrode of the secondary battery 30 is connected to a negative electrode of the cell 31 whose electric potential is lowest among the cells 31 to 33 constituting the secondary battery 30. Note that a positive electrode of a cell is an electrode at a higher potential side of the cell, and a negative electrode of a cell is an electrode at a lower potential side of the cell.

The battery protecting apparatus 80 is an example of a battery protecting apparatus that is powered by the secondary battery 40 and controls charging/discharging (charge/discharge operation) of the secondary battery 30 to protect the secondary battery 30 from over charging, and the like. The battery protecting apparatus 80 includes the plus terminal 5, the minus terminal 6, a cell balance circuit 30, a charge control transistor 1, a discharge control transistor 2, and a battery protecting circuit 70.

The plus terminal 5 is an example of a terminal connected to a plus side terminal of a charger or the load 90. The minus terminal 6 is an example of a terminal connected to a minus side terminal of the charger or the load 90.

The positive electrode, which is the positive electrode of the cell 33, of the secondary battery 30 and the plus terminal 5 are connected through a plus side power supply path 9a. The negative electrode, which is the negative electrode of the cell 31, of the secondary battery 30 and the minus terminal 6 are connected through a minus side power supply path 9b. The plus side power supply path 9a is an example of a charge/discharge current path between the positive electrode of the secondary battery 30 and the plus terminal 5. The minus side power supply path 9b is an example of a charge/discharge current path between the negative electrode of the secondary battery 30 and the minus terminal 6.

The negative electrode, which is the negative electrode of the cell 31, of the secondary battery 30 is connected to a VSS terminal via a wire 51. The positive electrode of the cell 31 and the negative electrode of the cell 32 are connected to a V1 terminal via a wire 52. The positive electrode of the cell 32 and the negative electrode of the cell 33 are connected to a V2 terminal via a wire 53. The positive electrode, which is the positive electrode of the cell 33, of the secondary battery 30 is connected to a VDD terminal via a wire 54.

The cell balance circuit 20 is an example of an equalization circuit that reduces a variation of cell voltages between the cells 31 to 33. The cell balance circuit 20 includes three cell balance circuit parts. The first cell balance circuit part is connected in parallel to the cell 31 via the wires 51 and 52. The second cell balance circuit part is connected in parallel to the cell 32 via the wires 52 and 53. The third cell balance circuit part is connected in parallel to the cell 33 via the wires 53 and 54.

The first cell balance circuit part causes the cell 31 to discharge in accordance with a command signal from an OUT1 terminal. The second cell balance circuit part causes the cell 32 to discharge in accordance with a command signal from an OUT2 terminal. The third cell balance circuit part causes the cell 33 to discharge in accordance with a command signal from an OUT3 terminal. A balance of the cell voltages between the cells 31 to 33 can be maintained by discharging the respective cells 31 to 33 such that the cell voltages of the cells 31 to 33 are equal to each other.

For example, the first cell balance circuit part includes a discharge circuit in which a discharge resistor 21b and a discharge transistor 21a are connected in series. Similarly, the second cell balance circuit part includes a discharge circuit in which a discharge resistor 22b and a discharge transistor 22a are connected in series, and the third cell balance circuit part includes a discharge circuit in which a discharge resistor 23b and a discharge transistor 23a are connected in series. The discharge transistor 21a is turned on in accordance with an on-command signal from the OUT1 terminal. Thereby, the cell 31 is discharged via the discharge resistor 21b and the discharge transistor 21a. The discharge transistor 22a is turned on in accordance with an on-command signal from the OUT2 terminal. Thereby, the cell 32 is discharged via the discharge resistor 22b and the discharge transistor 22a. The discharge transistor 23a is turned on in accordance with an on-command signal from the OUT3 terminal. Thereby, the cell 33 is discharged via the discharge resistor 23b and the discharge transistor 23a. For example, the discharge transistors 21a, 22a, and 23a are n-channel Metal Oxide Semiconductor Field Effect Transistors (MOSFETs).

The charge control transistor 1 is an example of a charging path disconnection part that disconnects (shuts off) a charging path of the secondary battery 30, and the discharge control transistor 2 is an example of a discharging path disconnection part that disconnects (shuts off) a discharging path of the secondary battery 30. In the example of FIG. 1, the charge control transistor 1 disconnects the power supply path 9b through which a charging current of the secondary battery 30 flows, and the discharge control transistor 2 disconnects the power supply path 9b through which a discharging current of the secondary battery 30 flows. The transistors 1 and 2 are switching elements that switch conduction/disconnection of the power supply path 9b and inserted in series on the power supply path 9b.

For example, the transistors 1 and 2 are n-channel MOS transistors. The charge control transistor 1 is inserted on the power supply path 9b such that a forward direction of a parasitic diode of the charge control transistor 1 is (matches) the discharging direction of the secondary battery 30. The discharge control transistor 2 is inserted on the power supply path 9b such that a forward direction of a parasitic diode of the discharge control transistor 2 is (matches) the charging direction of the secondary battery 30.

The battery protecting circuit 70 is an example of a battery control circuit that is used for the battery protecting apparatus 80. The battery protecting circuit 70 is an integrated circuit (IC) that performs an operation to protect the cells 31 to 33 of the secondary battery 30. The battery protecting circuit 70 includes a maximum voltage detecting part 71, a minimum voltage detecting part 72, a voltage detecting part 73, and a control circuit 74. Further, the battery protecting circuit 70 includes a COUT terminal, a VM terminal, a DOUT terminal, the OUT1 terminal, the OUT2 terminal, the OUT3 terminal, the VDD terminal, the VSS terminal, the V1 terminal, and the V2 terminal.

The COUT terminal is an example of a charge control terminal that is connected to a gate of the charge control transistor 1 and outputs a gate control signal for turning on or off the charge control transistor 1. The VM terminal is connected to the minus side power supply path 9b between the minus terminal 6 and the transistors 1 and 2. The DOUT terminal is an example of a discharge control terminal that is connected to a gate of the discharge control transistor 2 and outputs a gate control signal for turning on or off the discharge control transistor 1.

The control circuit 74 outputs, from the COUT terminal, a high level gate control signal for turning on the charge control transistor 1 by outputting a low level charge control signal COCNT for turning on a predriver 11a and for turning off a predriver 11b. The control circuit 74 turns on the charge control transistor 1 to allow an electric current to flow through the power supply path 9b in a direction of charging the secondary battery 30. On the other hand, the control circuit 74 outputs, from the COUT terminal, a low level gate control signal for turning off the charge control transistor 1 by outputting a high level charge control signal COCNT for turning off the predriver 11a and for turning on the predriver 11b. The control circuit 74 turns off the charge control transistor 1 to prevent an electric current from flowing through the power supply path 9b in the direction of charging the secondary battery 30.

The control circuit 74 outputs, from the DOUT terminal, a high level gate control signal for turning on the discharge control transistor 2 by outputting a low level discharge control signal DO_CNT for turning on a predriver 12a and for turning off a predriver 12b. The control circuit 74 turns on the discharge control transistor 2 to allow an electric current to flow through the power supply path 9b in a direction of discharging the secondary battery 30. On the other hand, the control circuit 74 outputs, from the DOUT terminal, a low level gate control signal for turning off the discharge control transistor 2 by outputting a high level discharge control signal DO_CNT for turning off the predriver 12a and for turning on the predriver 12b. The control circuit 74 turns off the discharge control transistor 2 to prevent an electric current from flowing through the power supply path 9b in the direction of discharging the secondary battery 30.

The OUT1 terminal is an example of a cell discharge control terminal from which a command signal for discharging the cell 31 is output in order to equalize the variation of the cell voltages between the cells 31 to 33. The OUT2 terminal is an example of a cell discharge control terminal from which a command signal for discharging the cell 32 is output in order to equalize the variation of the cell voltages between the cells 31 to 33. The OUT3 terminal is an example of a cell discharge control terminal from which a command signal for discharging the cell 33 is output in order to equalize the variation of the cell voltages between the cells 31 to 33.

The control circuit 74 outputs, from the OUT1 terminal, a high level command signal for turning on the discharge transistor 21a by outputting a low level discharge command signal OUT1_CNT for turning on a predriver 21d and for turning off a predriver 21c. The control circuit 74 turns on the discharge control transistor 21a to discharge the cell 31 via the discharge resistor 21b and the discharge transistor 21a. On the other hand, the control circuit 74 outputs, from the OUT1 terminal, a low level command signal for turning off the discharge transistor 21a by outputting a high level discharge command signal OUT1_CNT for turning off the predriver 21d and for turning on the predriver 21c. The control circuit 74 turns off the discharge transistor 21a to stop the cell 31 discharging via the discharge resistor 21b and the discharge transistor 21a.

The same applies to discharge control of the cell 32 by a discharge command signal OUT2_CNT and the predrivers 22d and 22c and to discharge control of the cell 33 by a discharge command signal OUT3_CNT and the predrivers 23d and 23c.

The VDD terminal is an example of a power supply terminal of the battery protecting circuit 70, and is connected to the positive electrode of the cell 33 and to the plus side power supply path 9a. The VSS terminal is an example of a ground terminal of the battery protecting circuit 70, and is connected to the negative electrode of the cell 31 and to the minus side power supply path 9b. The V1 terminal and the VSS terminal are terminals for detecting the cell voltage of the cell 31. The V1 terminal and the V2 terminal are terminals for detecting the cell voltage of the cell 32. The V2 terminal and the VDD terminal are terminals for detecting the cell voltage of the cell 33.

The maximum voltage detecting part 71 is a circuit that detects the maximum cell voltage among the cell voltages of the respective cells 31 to 33. The minimum voltage detecting part 72 is a circuit that detects the minimum cell voltage among the cell voltages of the respective cells 31 to 33. The voltage detecting part 73 is a circuit that detects a voltage for detecting overcharging of the secondary battery 30 and the like. The control circuit 74 is a circuit for controlling an operation of protecting the secondary battery 30 from overcharging and the like. Each of the maximum voltage detecting part 71, the minimum voltage detecting part 72, the voltage detecting part 73, and the control circuit 74 is a circuit constituted by an analog logical circuit without using a Central Processing Unit (CPU).

Figure 2:
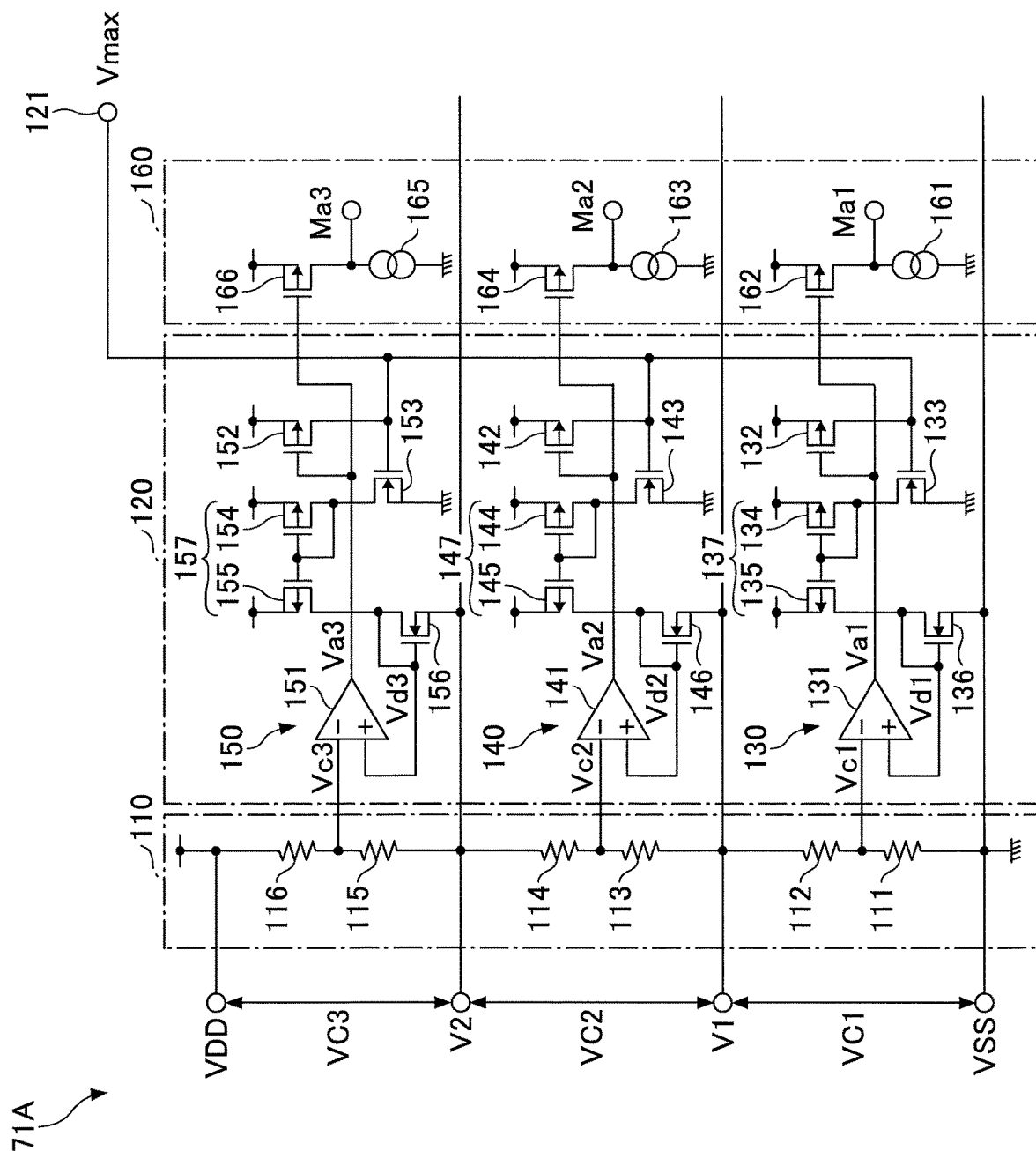
FIG. 2 is a diagram illustrating an example of a configuration of a maximum voltage detecting part.

FIG. 2 is a diagram illustrating an example of a configuration of a maximum voltage detecting part 71A. The maximum voltage detecting part 71A illustrated in FIG. 2 is an example of the maximum voltage detecting part 71 illustrated in FIG. 1. The maximum voltage detecting part 71A includes a level shift circuit 110, a maximum voltage output circuit 120, and a maximum voltage cell specifying circuit 160.

The level shift circuit 110 shifts respective levels of cell voltages of a plurality of cells to generate a plurality of level shift voltages. The level shift circuit 110 includes three level shift circuit parts.

The first level shift circuit part shifts the level of a cell voltage VC1 of the cell 31 to generate a level shift voltage Vc1 that is lower than the cell voltage VC1. The first level shift circuit part is connected in parallel to the cell 31 via the wires 51 and 52. The first level shift circuit part includes a voltage-dividing circuit in which a resistor 111 and a resistor 112 are connected in series and outputs the level shift voltage Vc1 from the voltage-dividing circuit.

The second level shift circuit part shifts the level of a cell voltage VC2 of the cell 32 to generate a level shift voltage Vc2 that is lower than the cell voltage VC2. The second level shift circuit part is connected in parallel to the cell 32 via the wires 52 and 53. The second level shift circuit part includes a voltage-dividing circuit in which a resistor 113 and a resistor 114 are connected in series and outputs the level shift voltage Vc2 from the voltage-dividing circuit.

The third level shift circuit part shifts the level of a cell voltage VC3 of the cell 33 to generate a level shift voltage Vc3 that is lower than the cell voltage VC3. The third level shift circuit part is connected in parallel to the cell 33 via the wires 53 and 54. The third level shift circuit part includes a voltage-dividing circuit in which a resistor 114 and a resistor 115 are connected in series and outputs the level shift voltage Vc3 from the voltage-dividing circuit.

If the cell voltage VC3 of the uppermost cell 33 is directly input to an inverting input terminal of an uppermost amplifier 151, it is impossible to generate a threshold voltage Vd3 input to a non-inverting input terminal of the amplifier 151 because the operating voltage for the circuit is insufficient or a voltage that is the same as the power supply voltage cannot be output. Hence, to the inverting input terminal of the amplifier 151, the level shift voltage Vc3, which is lower than the cell voltage VC3, is input.

The maximum voltage output circuit 120 outputs the maximum voltage Vmax corresponding to a cell voltage whose voltage value is highest among the plurality of cell voltages (which are the three cell voltages VC1, VC2, and VC3 in this case) with reference to an electric potential of the VSS terminal. The maximum voltage output circuit 120 includes, for the plurality of respective level shift voltages, a plurality of differential amplifier circuits. Each of the differential amplifier circuits compares the corresponding level shift voltage among the plurality of level sift voltages with a threshold voltage to generate an output voltage. In the example of FIG. 2, the maximum voltage output circuit 120 includes three differential amplifier circuits 130, 140, and 150.

The differential amplifier circuit 130 compares the level shift voltage Vc1 with the threshold voltage Vd1 to generate an output voltage Va1. The differential amplifier circuit 140 compares the level shift voltage Vc2 with the threshold voltage Vd2 to generate an output voltage Va2. The differential amplifier circuit 150 compares the level shift voltage Vc3 with the threshold voltage Vd3 to generate an output voltage Va3.

For example, the maximum voltage output circuit 120 simultaneously compares the output voltages Va1, Va2, and Va3 with each other to output the maximum voltage Vmax that matches the cell voltage whose voltage value is highest among the three cell voltages VC1, VC2, and VC3. The respective output parts of the differential amplifier circuits 130, 140, and 150 are connected in parallel to an output node 121 of the maximum voltage Vmax. Thereby, the maximum voltage output circuit 120 can compare the output voltages Va1, Va2, and Va3 with each other at the same time. In the example of FIG. 2, respective drains of output transistors 132, 142, and 152 are connected in parallel to the output node 121.

The output node 121 is connected, to the electric potential of the VSS terminal via resistors (for example, resistors 311 and 312 illustrated in FIG. 4 that will be described later below).

In FIG. 2, the differential amplifier circuit 130 includes an amplifier 131, the output transistor 132, a feedback transistor 133, a current mirror 137 having a pair of transistors 134 and 135, and a threshold transistor 136. The output transistor 132 is an example of an output switching element to which the output voltage Va1 is input. For example, the transistors 132, 134, and 135 are p-channel MOS transistors. For example, the transistors 133 and 136 are n-channel MOS transistors.

The amplifier 131 amplifies a voltage difference between the level shift voltage Vc1 input to the inverting input terminal and the threshold voltage Vd1 input to the non-inverting input terminal, and outputs the output voltage Va1 that is a voltage obtained by amplifying the voltage difference.

The output transistor 132 outputs, from the drain, a voltage that is in accordance with the value of the output voltage Va1 input to the gate. The drain output voltage of the output transistor 132 is input to the gate of the feedback transistor 133. The feedback transistor 133 converts the drain output voltage of the VSS terminal reference, input to the gate, into an electric current. The current mirror 137 returns the electric current converted by the feedback transistor 133, and inputs the returned electric current to the threshold transistor 136. The threshold transistor 136 generates the threshold voltage Vd1 by reconverting the electric current returned by the current mirror 137 (which is the electric current obtained by converting the drain output voltage of the output transistor 132) into a voltage that is with reference to the electric potential of the negative electrode of the cell 31. In the threshold transistor 136, the gate and the drain are connected to each other, and the source is connected to the electric potential of the negative electrode of the cell 31.

The differential amplifier circuit 140 includes an amplifier 141, the output transistor 142, a feedback transistor 143, a current mirror 147 having a pair of transistors 144 and 145, and a threshold transistor 146. The threshold transistor 146 generates the threshold voltage Vd2 by reconverting the electric current returned by the current mirror 147 (which is the electric current obtained by converting the drain output voltage of the output transistor 142) into a voltage that is with reference to the electric potential of the negative electrode of the cell 32. In the threshold transistor 146, the gate and the drain are connected to each other, and the source is connected to the electric potential of the negative electrode of the cell 32. Because the differential amplifier circuit 140 has a configuration the same as the differential amplifier circuit 130, the above described descriptions of the differential amplifier circuit 130 are applied to the descriptions of other elements and operations of the differential amplifier circuit 140 as appropriate.

The differential amplifier circuit 150 includes an amplifier 151, the output transistor 152, a feedback transistor 153, a current mirror 157 having a pair of transistors 154 and 155, and a threshold transistor 156. The threshold transistor 156 generates the threshold voltage Vd3 by reconverting the electric current returned by the current mirror 157 (which is the electric current obtained by converting the drain output voltage of the output transistor 152) into a voltage that is with reference to the electric potential of the negative electrode of the cell 33. In the threshold transistor 156, the gate and the drain are connected to each other, and the source is connected to the electric potential of the negative electrode of the cell 33. Because the differential amplifier circuit 150 has a configuration the same as the differential amplifier circuit 130, the above described descriptions of the differential amplifier circuit 130 are applied to the descriptions of other elements and operations of the differential amplifier circuit 150 as appropriate.

The output transistors 132, 142, and 152 are connected in parallel to the output node 121. Therefore, among the amplifiers 131, 141, and 151, at amplifiers to which level shift voltages that are lower than the maximum voltage Vmax are input (referred to as "non-maximum amplifiers"), the level shift voltages input to the non-inverting input terminals are lower than the threshold voltages. Hence, because the feedback of the non-maximum amplifiers is cut, and the output voltages of the non-maximum amplifiers become at the high level among the output voltages Va1, Va2, and Va3, the output transistors to which the high level output voltages are input are turned off among the output transistors 132, 142, and 152.

On the other hand, among the amplifiers 131, 141, and 151, feedback is applied to the amplifier to which the level shift voltage corresponding to the maximum voltage Vmax is input (referred to as "maximum amplifiers"). Hence, the maximum amplifier generates the output voltage to operate the output transistor such that the input level shift voltage matches the threshold voltage.

That is, the non-maximum amplifiers turn off corresponding output transistors among the output transistors 132, 142, and 152 so as to decrease the maximum voltage Vmax. Because the turned-off output transistors can be negligible, feedback is applied at the maximum voltage Vmax whose voltage value is highest. Accordingly, the maximum voltage Vmax is generated to the output node 121.

The maximum voltage cell specifying circuit 160 specifies a cell whose voltage value is highest among the plurality of cells (which are the three cells 31, 32, and 33 in this case), based on the plurality of output voltages (which are the three output voltages Va1, Va2, and Va3 in this case). For example, the maximum voltage cell specifying circuit 160 includes constant current sources 161, 163, and 165 that generate constant current and determining transistors 162, 164, and 166. For example, the determining transistors 162, 164, and 166 are p-channel MOS transistors.

The constant current source 161 is a circuit connected in series to a drain of the determining transistor 162. The output voltage Va1 is input to a gate of the determining transistor 162. The constant current source 163 is a circuit connected in series to a drain of the determining transistor 164. The output voltage Va2 is input to a gate of the determining transistor 164. The constant current source 165 is a circuit connected in series to a drain of the determining transistor 166. The output voltage Va3 is input to a gate of the determining transistor 166.

As described above, because the output voltages of the non-maximum amplifiers become the high level, determining transistors, to which the high level output voltages of the non-maximum amplifiers are input, among the determining transistors 162, 164, and 166 are turned off. Because the output voltage of the maximum amplifier becomes the low level, the determining transistor, to which the low level output voltage of the maximum amplifier is input, among the determining transistors 162, 164, and 166 is turned on.

Accordingly, among determination signals Ma1, Ma2, and Ma3, the maximum voltage cell specifying circuit 160 outputs, at low level, the determination signals corresponding to the cells having the cell voltages lower than the maximum voltage Vmax, and outputs, at high level, the determination signal corresponding to the cell having the maximum voltage Vmax. In this way, the maximum voltage cell specifying circuit 160 can specify the cell whose voltage value is highest among the plurality of cells.

FIG. 3 is a diagram illustrating an example of a configuration of a minimum voltage detecting part 72A. The minimum voltage detecting part 72A illustrated in FIG. 3 is an example of the minimum voltage detecting part 72 illustrated in FIG. 1. The minimum voltage detecting part 72A includes a level shift circuit 210, a minimum voltage output circuit 220, and a minimum voltage cell specifying circuit 260.

The level shift circuit 210 shifts respective levels of cell voltages of a plurality of cells to generate a plurality of level shift voltages. The level shift circuit 210 includes resistors 211 to 216. Because the level shift circuit 210 has a configuration the same as the level shift circuit 110 (see FIG. 2), the above described descriptions of the configuration of the level shift circuit 110 are applied to the configuration of the level shift circuit 210 as appropriate. Further, because the level shift circuit 210 has the configuration the same as the level shift circuit 110, the level shift circuit 210 may be integrated (communalized) with the level shift circuit 110 to be constituted by one level shift circuit.

The minimum voltage output circuit 220 outputs the minimum voltage Vmini corresponding to a cell voltage whose voltage value is lowest among the plurality of cell voltages (which are the three cell voltages VC1, VC2, and VC3 in this case) with reference to an electric potential of the VSS terminal. The minimum voltage output circuit 220 includes, for the plurality of respective level shift voltages, a plurality of differential amplifier circuits. Each of the differential amplifier circuits compares the corresponding level shift voltage among the plurality of level sift voltages with a threshold voltage to generate an output voltage. In the example of FIG. 3, the minimum voltage output circuit, 220 includes three differential amplifier circuits 230, 240, and 250.

The differential amplifier circuit 230 compares the level shift voltage Vc1 with a threshold voltage Ve1 to generate an output voltage Vb1. The differential amplifier circuit 240 compares the level shift voltage Vc2 with a threshold voltage Ve2 to generate an output voltage Vb2. The differential amplifier circuit 250 compares the level shift voltage Vc3 with a threshold voltage Ve3 to generate an output voltage Vb3.

For example, the minimum voltage output circuit 220 simultaneously compares the output voltages Vb1, Vb2, and Vb3 with each other to output the minimum voltage Vmini that matches the cell voltage whose voltage value is lowest among the three cell voltages VC1, VC2, and VC3. The respective output parts of the differential amplifier circuits 230, 240, and 250 are connected in series to an output node 221 of the minimum voltage Vmini. Thereby, the minimum voltage output circuit 220 can compare the output voltages Vb1, Vb2, and Vb3 with each other at the same time. In the example of FIG. 3, respective drains of output transistors 232, 242, and 252 are connected in series to the output node 221.

The output node 221 is connected, to the electric potential of the VSS terminal via resistors (for example, resistors 321 and 322 illustrated in FIG. 4 that will be described later below).

In FIG. 3, the differential amplifier circuit 230 includes an amplifier 231, the output transistor 232, a feedback transistor 233, a current mirror 237 having a pair of transistors 234 and 235, and a threshold transistor 236. The differential amplifier circuit 240 includes an amplifier 241, the output transistor 242, a feedback transistor 243, a current mirror 247 having a pair of transistors 244 and 245, and a threshold transistor 246. The differential amplifier circuit 250 includes an amplifier 251, the output transistor 252, a feedback transistor 253, a current mirror 257 having a pair of transistors 254 and 255, and a threshold transistor 256.

Because each of the differential amplifier circuits 230, 240, and 250 has a configuration the same as the differential amplifier circuit 130 (see FIG. 2), the above described descriptions of the configuration of the differential amplifier circuit 130 are applied to the descriptions of the configuration of the differential amplifier circuits 230, 240, and 250 as appropriate.

The output transistors 232, 242, and 252 are connected in series to the output node 221. Among the amplifiers 231, 241, and 251, at amplifiers to which level shift voltages that are higher than the minimum voltage Vmin are input (referred to as "non-minimum amplifiers"), the level shift voltages input to the non-inverting input terminals are higher than the threshold voltages. Hence, because the output voltages of the non-minimum amplifiers become at the low level among the output voltages Vb1, Vb2, and Vb3, the output transistors to which the low level output voltages are input are completely turned on among the output transistors 232, 242, and 252.

On the other hand, among the amplifiers 231, 241, and 251, feedback is applied to the amplifier to which the level shift voltage corresponding to the minimum voltage Vmin is input (referred to as "minimum amplifiers"). Hence, the minimum amplifier generates the output voltage to operate the output transistor such that the input level shift voltage matches the threshold voltage. Accordingly, the minimum voltage Vmin is generated to the output node 221.

That is, the non-minimum amplifiers completely turn on corresponding output transistors among the output transistors 232, 242, and 252 so as to increase the minimum voltage Vmin (that is, the output transistors operate in a linear region). Because the completely turned-on output transistors can be negligible, feedback is applied at the minimum voltage Vmin whose voltage value is lowest. Accordingly, the minimum voltage Vmin is generated to the output node 221.

The minimum voltage cell specifying circuit 260 specifies a cell whose voltage value is lowest among the plurality of cells (which are the three cells 31, 32, and 33 in this case), based on the plurality of output voltages (which are the three output voltages Vb1, Vb2, and Vb3 in this case). For example, the minimum voltage cell specifying circuit 260 includes constant current sources 261, 263, and 265 that generate constant current and includes determining transistors 262, 264, and 266. For example, the determining transistors 262, 264, and 266 are p-channel MOS transistors.

The constant current source 261 is a circuit connected in series to a drain of the determining transistor 262. The output voltage Vb1 is input to agate of the determining transistor 262. The constant current source 263 is a circuit connected in series to a drain of the determining transistor 264. The output voltage Vb2 is input to a gate of the determining transistor 264. The constant current source 265 is a circuit connected in series to a drain of the determining transistor 266. The output voltage Vb3 is input to a gate of the determining transistor 266.

As described above, because the output voltages of the non-minimum amplifiers become the low level, determining transistors, to which the low level output voltages of the non-minimum amplifiers are input, among the determining transistors 262, 264, and 266 are turned on. Because the output voltage of the minimum amplifier becomes the low level, the determining transistor, to which the low level output voltage of the maximum amplifier is input, among the determining transistors 262, 264, and 266 is turned off. Accordingly, among determination signals Mi1, Mi2, and Mi3, the minimum voltage cell specifying circuit 260 outputs, at high level, the determination signals, corresponding to the cells having the cell voltages higher than the minimum voltage Vmin, and outputs, at low level, the determination signal, corresponding to the cell having the minimum voltage Vmin. In this way, the minimum voltage cell specifying circuit 260 can specify the cell whose voltage value is lowest among the plurality of cells.

Figure 4:
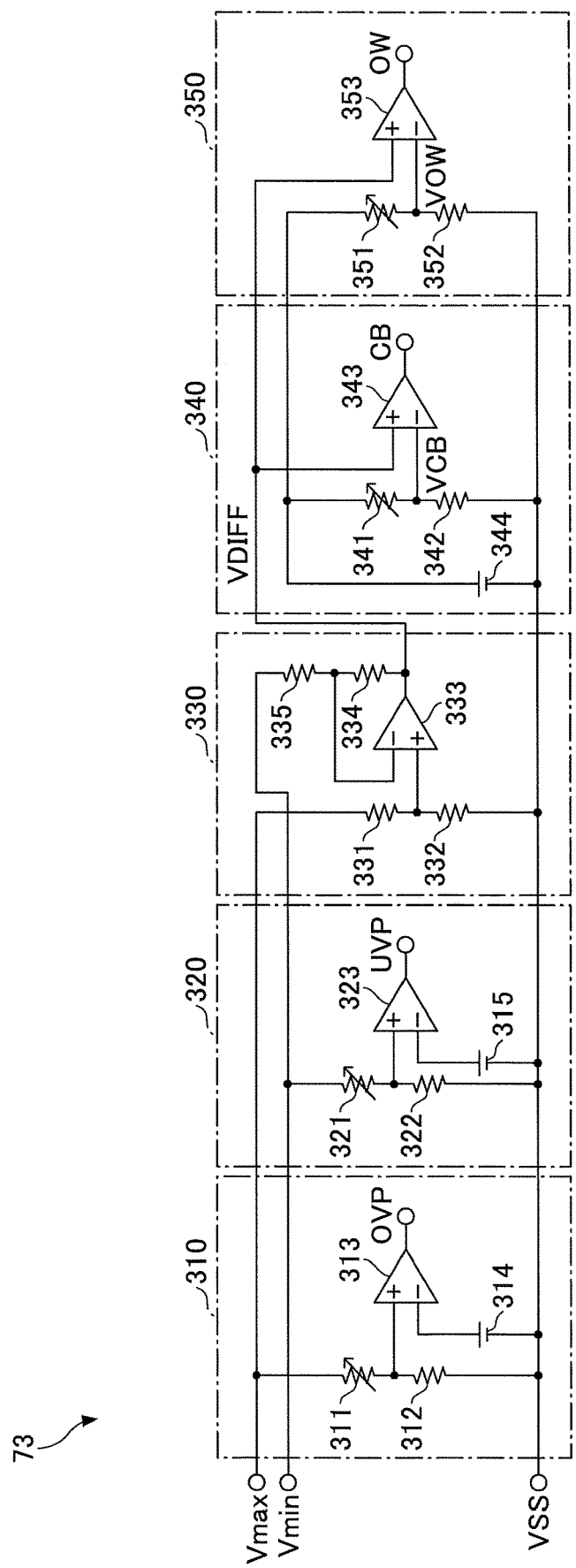
FIG. 4 is a diagram illustrating an example of a configuration of a voltage detecting part.

FIG. 4 is a diagram illustrating an example of a configuration of a voltage detecting part 73. The voltage detecting part 73 illustrated in FIG. 4 is an example of the voltage detecting part 73 illustrated in FIG. 1. The voltage detecting part 73 includes an overcharge detecting circuit 310, an over-discharge detecting circuit 320, a difference voltage amplifier circuit 330, a cell balance control detecting circuit 340, and a disconnection detecting circuit 350.

The overcharge detecting circuit 310 detects overcharging of the secondary battery 30 based on the maximum voltage Vmax. The overcharge detecting circuit 310 detects whether the maximum voltage Vmax exceeds a predetermined overcharge detection threshold value. In a case of detecting that the maximum voltage Vmax exceeds the predetermined overcharge detection threshold value, the overcharge detecting circuit 310 outputs an overcharge detection signal OVP. For example, the overcharge detecting circuit 310 includes a comparator 313 that compares a voltage obtained by voltage-dividing the maximum voltage Vmax by a resistor 311 and a resistor 312 with a detection voltage 314. The overcharge detecting circuit 310 causes the comparator 313 to detect whether the maximum voltage Vmax exceeds the predetermined overcharge detection threshold value.

The over-discharge detecting circuit 320 detects over-discharging of the secondary battery 30 based on the minimum voltage Vmin. The over-discharge detecting circuit 320 detects whether the minimum voltage Vmin is less than a predetermined over-discharge detection threshold value. In a case of detecting that the minimum voltage Vmin is less than the predetermined over-discharge detection threshold value, the over-discharge detecting circuit 320 outputs an over-discharge detection signal UVP. For example, the over-discharge detecting circuit 320 includes a comparator 323 that compares a voltage obtained by voltage-dividing the minimum voltage Vmin by a resistor 321 and a resistor 322 with a detection voltage 315. The over-discharge detecting circuit 320 causes the comparator 323 to detect whether the minimum voltage Vmin is less than the predetermined over-discharge detection threshold value.

The difference voltage amplifier circuit 330 outputs a difference voltage VDIFF that is proportional to a difference D between the maximum voltage Vmax and the minimum voltage Vmin. For example, the difference voltage amplifier circuit 330 includes resistors 331, 332, 333, 334, and 335 and an amplifier 336, and outputs the difference voltage VDIFF proportional to the difference D obtained by subtracting the minimum voltage Vmin from the maximum voltage Vmax.

The cell balance control detecting circuit 340 detects whether the difference voltage VDIFF exceeds a predetermined cell balance control threshold value VCB. In a case of detecting that the difference voltage VDIFF exceeds the cell balance control threshold value VCB, the cell balance control detecting circuit 340 outputs a cell balance control enabling signal CB. For example, the cell balance control detecting circuit 340 includes a comparator 343 that compares the difference voltage VDIFF with the cell balance control threshold value VCB. The cell balance control threshold value VCB is generated by voltage-dividing a reference voltage 344 by the resistor 341 and the resistor 342.

The disconnection detecting circuit 350 detects whether the difference voltage VDIFF exceeds a predetermined disconnection detection threshold value VOW. In a case of detecting that the difference voltage VDIFF exceeds the predetermined disconnection detection threshold value VOW, the disconnection detecting circuit 350 outputs a disconnection detection signal VOW. For example, the disconnection detecting circuit 350 includes a comparator 353 that compares the difference voltage VDIFF with the disconnection detection threshold value VOW. The disconnection detection threshold value VOW is generated by voltage-dividing the reference voltage 344 by the resistor 351 and the resistor 352. The disconnection detection threshold value VOW is set to be higher than the cell balance control threshold value VCB.

Figure 5:
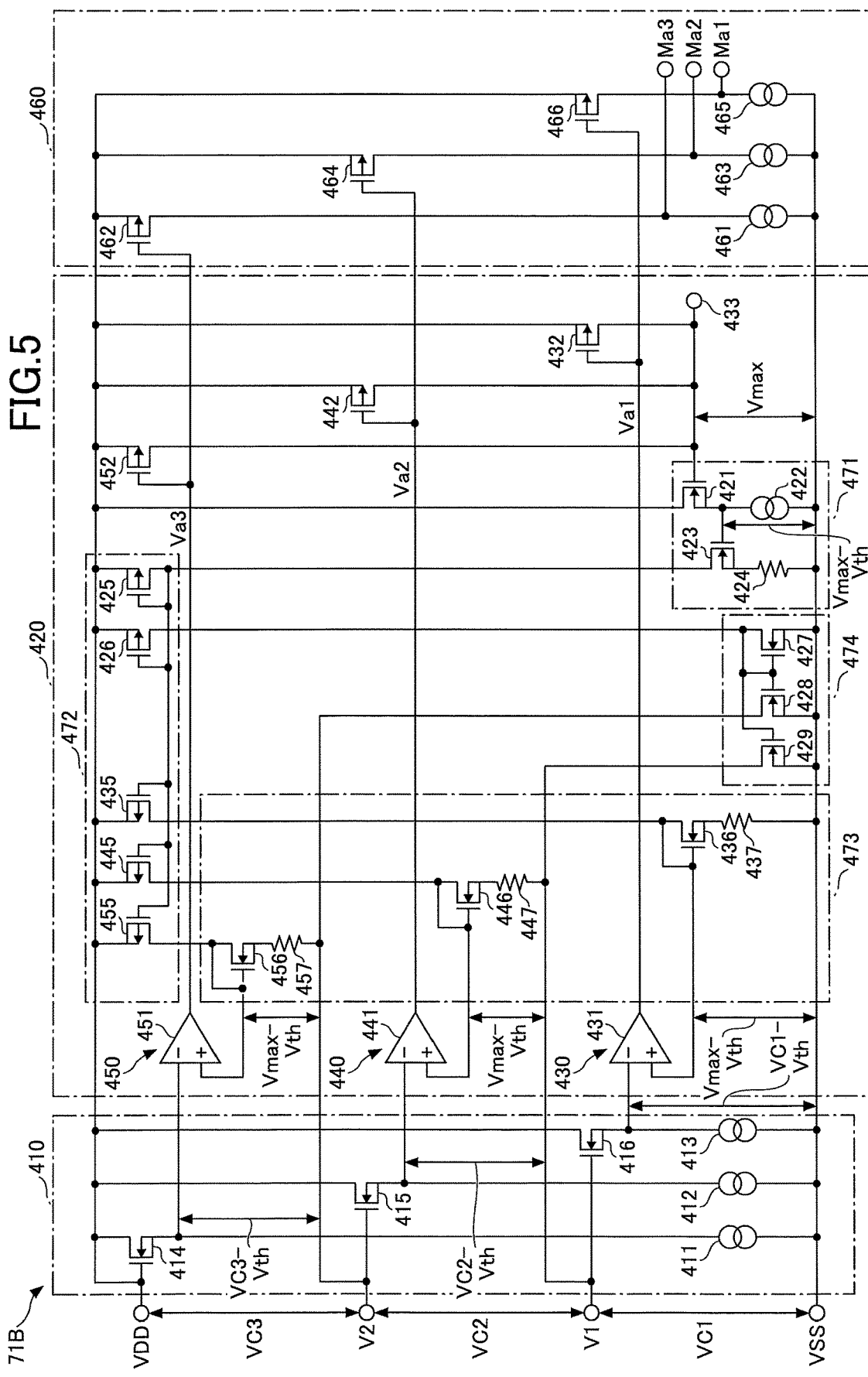
FIG. 5 is a diagram illustrating another example of a configuration of a maximum voltage detecting part.

FIG. 5 is a diagram illustrating another example of a configuration of a maximum voltage detecting part 71B. The maximum voltage detecting part 71B illustrated in FIG. 4 is an example of the maximum voltage detecting part 71 illustrated in FIG. 1. The maximum voltage detecting part 71B includes a level shift circuit 410, a maximum voltage output circuit 420, and a maximum voltage cell specifying circuit 460.

The level shift circuit 410 shifts respective levels of cell voltages of a plurality of cells to generate a plurality of level shift voltages. The level shift circuit 410 includes, for the plurality of respective cells, a plurality of level shift circuit parts in each of which a level shift element, whose input part is connected to a positive electrode of a cell, and a constant current source, connected between an output part of the level shift element and a common ground, are connected in series. In the example of FIG. 5, the level shift circuit 410 includes three level shift circuit parts.

The first level shift circuit part shifts the level of the cell voltage VC1 of the cell 31 to generate a level shift voltage (VC1-Vth) that is lower than the cell voltage VC1. The first level shift circuit part has a configuration in which the n-channel MOS transistor 416 and the constant current source 413 are connected in series. A gate of the MOS transistor 416 is connected to the V1 terminal, a source of the MOS transistor 416 is connected to the constant current source 413, and a drain of the MOS transistor 416 is connected to the VDD terminal. Here, Vth in the level shift voltage (VC1-Vth) is a threshold voltage between the gate and the source of the MOS transistor 416. A constant current generated by the constant current source 413 flows through the MOS transistor 416. Thereby, the level shift voltage (VC1-Vth) is output from the source of the MOS transistor 416.

The first level shift circuit part shifts the level of the cell voltage VC2 of the cell 32 to generate a level shift voltage (VC2-Vth) that is lower than the cell voltage VC2. The second level shift circuit part has a configuration in which the n-channel MOS transistor 415 and the constant current source 412 are connected in series. A gate of the MOS transistor 415 is connected to the V2 terminal, a source of the MOS transistor 415 is connected to the constant current source 412, and a drain of the MOS transistor 415 is connected to the VDD terminal. Here, Vth in the level shift voltage (VC2-Vth) is a threshold voltage between the gate and the source of the MOS transistor 415. A constant current generated by the constant current source 412 flows through the MOS transistor 415. Thereby, the level shift voltage (VC2-Vth) is output from the source of the MOS transistor 415.

The third level shift circuit part shifts the level of the cell voltage VC3 of the cell 33 to generate a level shift voltage (VC3-Vth) that is lower than the cell voltage VC3. The third level shift circuit part has a configuration in which the n-channel MOS transistor 414 and the constant current source 411 are connected in series. A gate of the MOS transistor 414 is connected to the VDD terminal, a source of the MOS transistor 414 is connected to the constant current source 411, and a drain of the MOS transistor 414 is connected to the VDD terminal. Here, Vth in the level shift voltage (VC3-Vth) is a threshold voltage between the gate and the source of the MOS transistor 414. A constant current generated by the constant current source 411 flows through the MOS transistor 414. Thereby, the level shift voltage (VC3-Vth) is output from the source of the MOS transistor 414.

The MOS transistors 414 to 416 are respectively examples of level shift elements whose input parts are connected to the positive electrodes of the cells. The constant current sources 411 to 413 are respectively examples of constant current sources connected between the output parts of the level shift elements and the common ground.

By connecting the gate of the MOS transistor 416 to the V1 terminal, a terminal current flowing in the V1 terminal can be made to be substantially zero. Further, because the V1 terminal has a high impedance, it is possible to detect the cell voltages of the cells 31 and 32 connected to the V1 terminal with high accuracy. Similarly, by connecting the gate of the MOS transistor 415 to the V2 terminal, a terminal current flowing in the V2 terminal can be made to be substantially zero. Further, because the V2 terminal has a high impedance, it is possible to detect the cell voltages of the cells 32 and 33 connected to the V2 terminal with high accuracy.

If the cell voltage VC3 of the uppermost cell 33 is directly input to an inverting input terminal of an uppermost amplifier 451, it is impossible to generate a threshold voltage (Vmax-Vth) input to a non-inverting input terminal of the amplifier 451 because the operating voltage for the circuit is insufficient or a voltage that is the same as the power supply voltage cannot be output. Hence, to the inverting input terminal of the amplifier 451, the level shift voltage (VC3-Vth), which is lower than the cell voltage VC3, is input.

The maximum voltage output circuit 420 outputs the maximum voltage Vmax corresponding to a cell voltage whose voltage value is highest among the plurality of cell voltages (which are the three cell voltages VC1, VC2, and VC3 in this case) with reference to an electric potential of the VSS terminal. The maximum voltage output circuit 420 includes, for the plurality of respective level shift voltages, a plurality of differential amplifier circuits. Each of the differential amplifier circuits compares the corresponding level shift voltage among the plurality of level sift voltages with a threshold voltage to generate an output voltage. In the example of FIG. 5, the maximum voltage output circuit 420 includes three differential amplifier circuits 430, 440, and 450.

The differential amplifier circuit 430 compares the level shift voltage (VC1-Vth) with the threshold voltage (Vmax-Vth) to generate an output voltage Va1. The differential amplifier circuit 440 compares the level shift voltage (VC2-Vth) with the threshold voltage (Vmax-Vth) to generate an output voltage Va2. The differential amplifier circuit 450 compares the level shift voltage (VC3-Vth) with the threshold voltage (Vmax-Vth) to generate an output voltage Va3.

For example, the maximum voltage output circuit 420 simultaneously compares the output voltages Va1, Va2, and Va3 with each other to output the maximum voltage Vmax that matches the cell voltage whose voltage value is highest among the three cell voltages VC1, VC2, and VC3. The respective output parts of the differential amplifier circuits 430, 440, and 450 are connected in parallel to an output node 433 of the maximum voltage Vmax. Thereby, the maximum voltage output circuit 420 can compare the output voltages Va1, Va2, and Va3 with each other at the same time. In the example of FIG. 5, respective drains of output transistors 432, 442, and 452 are connected in parallel to the output node 433.

The output node 433 is connected, to the electric potential of the VSS terminal via resistors (for example, the resistors 311 and 312 illustrated in FIG. 4).

In FIG. 5, the maximum voltage output circuit 420 includes the output transistors 432, 442, and 452, a voltage/current converting part 471, a current mirror 472, a current/voltage converting part 473, and a correction circuit 474. The functions of the differential amplifier circuits 430, 440, and 450 are similar to those of the above described differential amplifier circuits 130, 140, and 150.

The voltage/current converting part 471 converts the maximum voltage Vmax into an electric current. The voltage/current converting part 471 generates a converted voltage (Vmax-Vth) that is lower than the maximum voltage Vmax by the MOS transistor 421 and the constant current source 422. Here, Vth in the converted voltage (Vmax-Vth) is a threshold voltage between the gate and the source of the MOS transistor 421. The converted voltage (Vmax-Vth) is input to the gate of the MOS transistor 423. Thereby, an electric current flows through the resistor 424. In this way, the voltage/current converting part 471 can convert the maximum voltage Vmax into an electric current corresponding to the maximum voltage Vmax.

The current mirror 472 causes the transistors 425, 435, 445, and 455 to return the electric current converted by the voltage/current converting part 471, and input the returned electric current to each of the threshold transistors 436, 446, and 456.

The threshold transistor 436 and the resistor 437 generate the threshold voltage (Vmax-Vth) by reconverting the electric current returned by the current mirror 472 into a voltage that is with reference to the electric potential of the negative electrode of the cell 31. The gate and the drain of the threshold transistor 436 are connected to each other, and the source of the threshold transistor 436 is connected to the electric potential of the negative electrode of the cell 31 via the resistor 437. The same applies to the threshold transistor 446 and the resistor 447 and to the threshold transistor 456 and the resistor 457.

The output transistors 432, 442, and 452 are connected in parallel to the output node 433. Accordingly, similar to the case of FIG. 2, the output voltages of the non-maximum amplifiers become at the high level among the output voltages Va1, Va2, and Va3, the output transistors to which the high level output voltages are input are turned off among the output transistors 432, 442, and 452. On the other hand, similar to the case of FIG. 2, the maximum amplifier generates the output voltage to operate the output transistor such that the input level shift voltage matches the threshold voltage. Accordingly, the maximum voltage Vmax is generated to the output node 433.

The correction circuit 474 draws a correction current the same as the V1 terminal current by the transistor 429 such that the terminal current (V1 terminal current) flowing from the MOS transistor 446 and the resistor 447 to the V1 terminal is decreased. Thereby, the variation between the cell voltages of the cells 31 to 33 can be suppressed from being increased by the V1 terminal current.

Similarly, the correction circuit 474 draws a correction current the same as the V2 terminal current by the transistor 428 such that the terminal current (V2 terminal current) flowing from the MOS transistor 456 and the resistor 457 to the V2 terminal is decreased. Thereby, the variation between the cell voltages of the cells 31 to 33 can be suppressed from being increased by the V2 terminal current.

The correction circuit 474 is a current mirror that draws, by the transistor 427, the electric current returned by the transistor 426 of the current mirror 472 to adjust the drawing amount of electric current by the transistors 428 and 429.

The maximum voltage cell specifying circuit 460 specifies a cell whose voltage value is highest among the plurality of cells (which are the three cells 31, 32, and 33 in this case), based on the plurality of output voltages (which are the three output voltages Va1, Va2, and Va3 in this case). For example, the maximum voltage cell specifying circuit 460 includes constant current sources 461, 463, and 465 that generate constant current and determining transistors 462, 464, and 466. The maximum voltage cell specifying circuit 460 has a configuration similar to that of the maximum voltage cell specifying circuit 160 described above.

Figure 6:
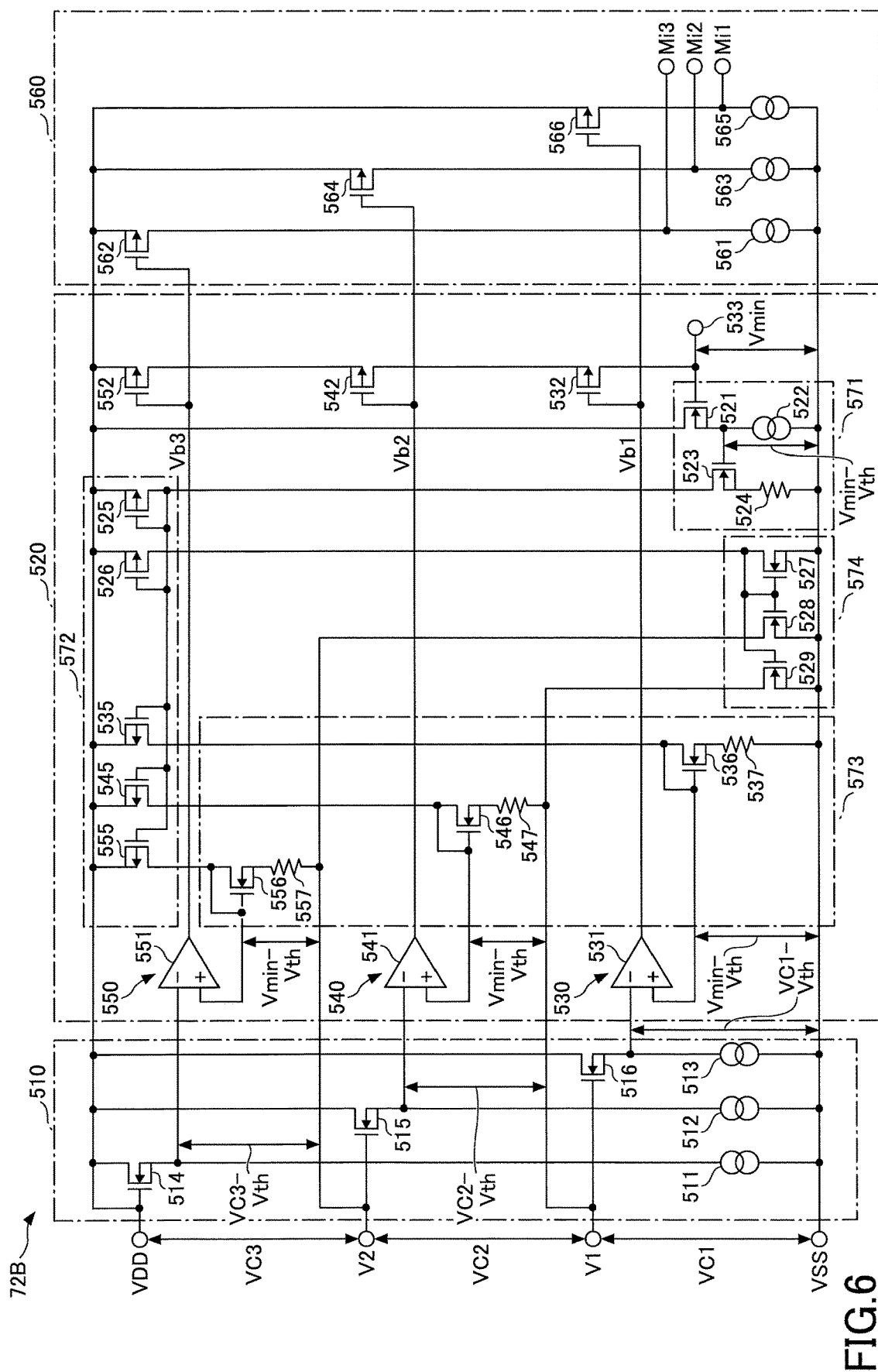
FIG. 6 is a diagram illustrating an example of a configuration of a minimum voltage detecting part.

FIG. 6 is a diagram illustrating another example of a configuration of a minimum voltage detecting part 72B. The minimum voltage detecting part 72B illustrated in FIG. 6 is an example of the minimum voltage detecting part 72 illustrated in FIG. 1. The minimum voltage detecting part 72B includes a level shift circuit 510, a minimum voltage output circuit 520, and a minimum voltage cell specifying circuit 560.

The level shift circuit 510 shifts respective levels of cell voltages of a plurality of cells to generate a plurality of level shift voltages. The level shift circuit 510 includes constant current sources 511 to 513 and determining transistors 514 to 516. Because the level shift circuit 510 has a configuration the same as the level shift circuit 410 (see FIG. 5), the above described descriptions of the configuration of the level shift circuit 410 are applied to the descriptions of the configuration of the level shift circuit 510 as appropriate. Further, because the level shift circuit 510 has the configuration the same as the level shift circuit 410, the level shift circuit 510 may be integrated (communalized) with the level shift circuit 410 to be constituted by one level shift circuit.

The minimum voltage output circuit 520 outputs the minimum voltage Vmin corresponding to a cell voltage whose voltage value is lowest among the plurality of cell voltages (which are the three cell voltages VC1, VC2, and VC3 in this case) with reference to an electric potential of the VSS terminal. The minimum voltage output circuit 520 includes, for the plurality of respective level shift voltages, a plurality of differential amplifier circuits. Each of the differential amplifier circuits compares the corresponding level shift voltage among the plurality of level sift voltages with a threshold voltage to generate an output voltage. In the example of FIG. 6, the minimum voltage output circuit 520 includes three differential amplifier circuits 530, 540, and 550.

For example, the minimum voltage output circuit 520 simultaneously compares the output voltages Vb1, Vb2, and Vb3 with each other to output the minimum voltage Vmini that matches the cell voltage whose voltage value is lowest among the three cell voltages VC1, VC2, and VC3. The respective output parts of the differential amplifier circuits 530, 540, and 550 are connected in series to an output node 533 of the minimum voltage Vmini. Thereby, the minimum voltage output circuit 520 can compare the output voltages Vb1, Vb2, and Vb3 with each other at the same time. In the example of FIG. 6, respective drains of output transistors 532, 542, and 552 are connected in series to the output node 533.

The output node 533 is connected, to the electric potential of the VSS terminal via resistors (for example, the resistors 321 and 322 illustrated in FIG. 4).

In FIG. 6, the minimum voltage output circuit 520 includes the output transistors 532, 542, and 552, a voltage/current converting part 571, a current mirror 472, a current/voltage converting part 573, and a correction circuit 574. The functions of the differential amplifier circuits 530, 540, and 550 are similar to those of the above described differential amplifier circuits 430, 440, and 450.

The voltage/current converting part 571 includes MOS transistors 521 and 523 a constant current source 522, and a resistor 524. The current mirror 572 includes transistors 525, 526, 535, 545, and 555. The current/voltage converting part 573 includes threshold transistors 536, 546, and 556, and resistors 537, 547, and 557. The correction circuit 574 includes transistors 527 to 529. Because the differential amplifier circuits 530, 540, and 550 has a configuration the same as the differential amplifier circuits 430, 440, and 450 (see FIG. 5), the above described descriptions of the configuration of the differential amplifier circuits 430, 440, and 450 are applied to the descriptions of the configuration of the differential amplifier circuits 530, 540, and 550 as appropriate.

The minimum voltage cell specifying circuit 560 specifies a cell whose voltage value is lowest among the plurality of cells (which are the three cells 31, 32, and 33 in this case), based on the plurality of output voltages (which are the three output voltages Vb1, Vb2, and Vb3 in this case). For example, the minimum voltage cell specifying circuit 560 includes constant current sources 561, 563, and 565 and determining transistors 562, 564, and 566. A configuration of the minimum voltage cell specifying circuit 560 is similar to the configuration of the above described minimum voltage cell specifying circuit 260.

Figure 7:
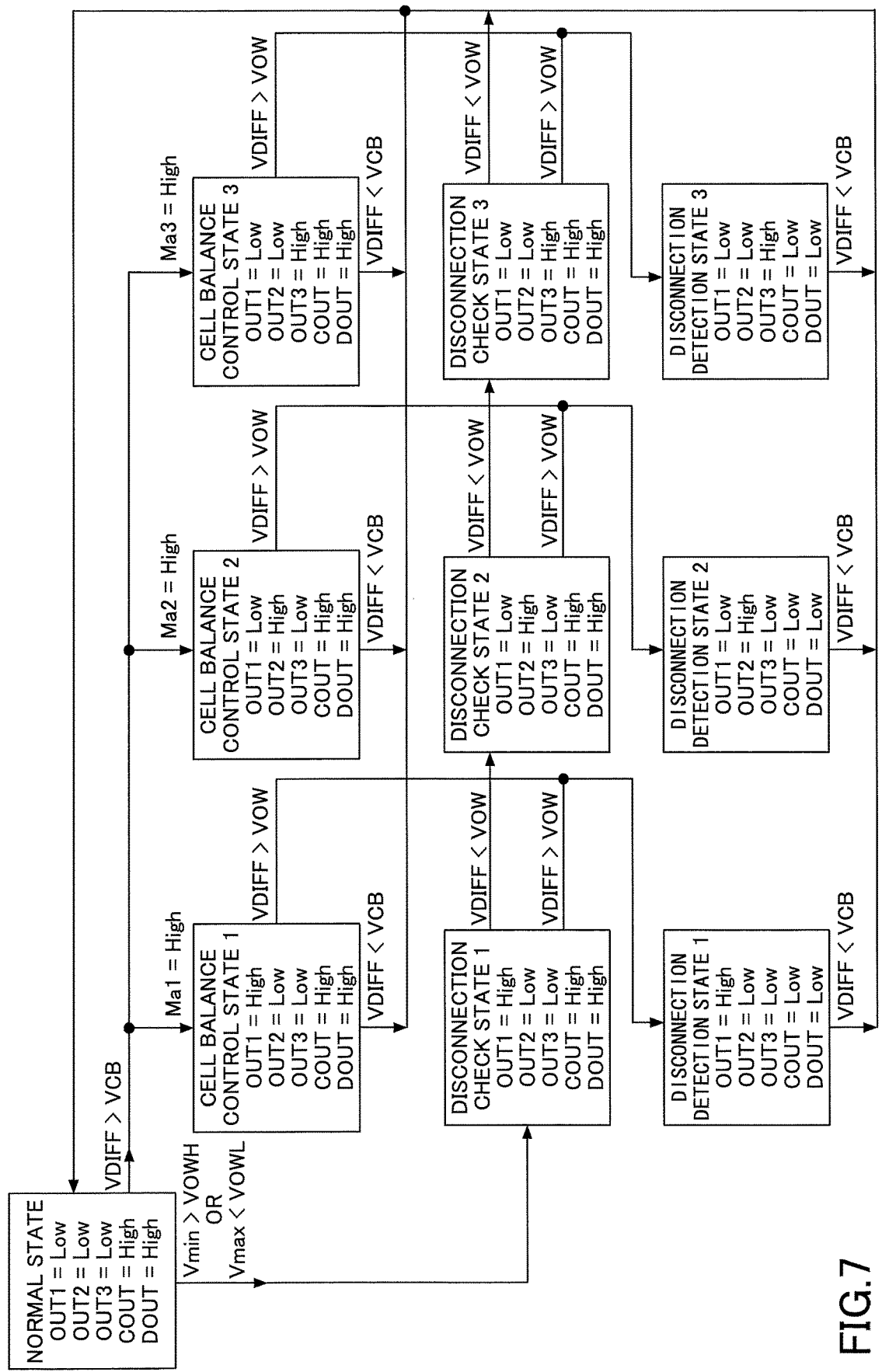
FIG. 7 is a state transition diagram illustrating an example of transitions of a control state of a control circuit.

FIG. 7 is a state transition diagram illustrating an example of transitions of a control state of the control circuit 74 illustrated in FIG. 1. In FIG. 7, "High" indicates that the signal level at the terminal is the high level, and "low" indicates that the signal level at the terminal is the low level.

In a normal state, the control circuit 74 causes the cell, specified by the maximum voltage cell specifying circuit, to discharge when it is detected by the cell balance control detecting circuit 340 of FIG. 4 that the difference voltage VDIFF exceeds the cell balance control threshold value VCB. In a case of detecting that the difference voltage VDIFF exceeds the cell balance control threshold value VCB, the cell balance control detecting circuit 340 outputs a cell balance control enabling signal CB.

When the determination signal Ma1 is at the high level, the control circuit 74 outputs the discharge command signal OUT1_CNT for turning the signal level of the OUT1 terminal into the high level to discharge the cell 31 (CELL BALANCE CONTROL STATE 1). When the determination signal Ma2 is at the high level, the control circuit 74 outputs the discharge command signal OUT2_CNT for turning the signal level of the OUT2 terminal into the high level to discharge the cell 32 (CELL BALANCE CONTROL STATE 2). When the determination signal Ma3 is at the high level, the control circuit 74 outputs the discharge command signal OUT3_CNT for turning the signal level of the OUT3 terminal into the high level to discharge the cell 33 (CELL BALANCE CONTROL STATE 3). In other words, upon detecting that the difference between the maximum voltage Vmax and the minimum voltage Vmin exceeds a predetermined threshold for discharge, the control circuit 74 may cause a cell, specified by the maximum specified by the maximum voltage cell specifying circuit, to discharge.

In this way, it is possible to forcibly discharge the cell specified by the maximum, voltage cell specifying circuit and having the maximum voltage Vmax. Accordingly, it is possible to suppress (reduce) a variation of the cell voltages between the cells with high accuracy and to protect the secondary battery 30 with high accuracy.

In a case where the cell balance control detecting circuit 340 of FIG. 4 detects that the difference voltage VDIFF is lower than the cell balance control threshold value VCB in any of the cell balance control states, the control circuit 74 determines that the variation of the cell voltages is suppressed by the cell balance control. In this case, the control circuit 74 stops discharging the cell specified by the maximum voltage cell specifying circuit. Thereby, each cell balance control state transitions to the normal state.

On the other hand, in any of the cell balance control states, when the disconnection detecting circuit 350 of FIG. 4 detects that the difference voltage VDIFF exceeds the disconnection detection threshold value VOW, the control circuit 74 determines that the wire connected to the cell specified by the maximum voltage cell specifying circuit is disconnected. Any of the cell balance control states indicates a state of commanding the cell, specified by the maximum voltage cell specifying circuit, to discharge. In other words, upon detecting that the difference between the maximum voltage Vmax and the minimum voltage Vmin a predetermined threshold for disconnection in a state of commanding one of the cells 31 to 33 to discharge, the control circuit 74 may determine that a wire for connection of the one cell is disconnected. Here, the one cell may be the cell specified by the maximum voltage cell specifying circuit.

For example, in FIG. 1, a case will be described in which the wire 53 connected to the negative electrode of the cell 33 is disconnected when the cell voltage of the cell 33 is the maximum voltage Vmax. In this case, because the determination signal becomes at the high level, the control circuit 74 outputs the discharge command signal OUT3_CNT for turning the signal level of the OUT3 terminal into the high level to discharge the cell 33 (CELL BALANCE CONTROL STATE 3). At this time, the discharge transistor 23a is turned on. When the wire 53 is not disconnected in a state in which the discharge transistor 23a is on, the cell voltage of the cell 33 is directly input to each of the maximum voltage detecting part 71 and the minimum voltage detecting part 72. However, when the wire 53 is disconnected in the state in which the discharge transistor 23a is on, a substantially zero voltage is input to each of the maximum voltage detecting part 71 and the minimum voltage detecting part 72.

Thus, when the wire 53 is disconnected, the minimum voltage Vmin output from the minimum voltage output circuit decreases to substantially zero, and the difference voltage VDIFF increases. Accordingly, in the cell balance control state 3, when the disconnection detecting circuit 350 detects that the difference voltage VDIFF exceeds the disconnection detection threshold value VOW, the control circuit 74 can determine that either the wire 53 or the wire 54 connected to the cell 33 is disconnected (DISCONNECTION DETECTION STATE 3).

For example, in the disconnection detection state 3, the control circuit 74 may output the charge control signal CO CNT for turning the signal level of the COUT terminal into the low level to prohibit charging of the secondary battery 30. Alternatively, in the disconnection detection state 3, the control circuit 74 may output the discharge control signal DO_CNT for turning the signal level of the OUT terminal into the low level to prohibit discharging of the secondary battery 30.

In the disconnection detection state 3, when the cell balance control detecting circuit 340 detects that the difference voltage VDIFF is lower than the cell balance control threshold value VCB, the control circuit 74 determines that the disconnection is dissolved (the connection state between the wire 53 and the wire 54 becomes normal). In this case, the control state of the control circuit 74 transitions to the normal state from the disconnection detection state 3.

Similarly, in the cell balance control state 1, when the disconnection detecting circuit 350 detects that the difference voltage VDIFF exceeds the disconnection detection threshold value VOW, the control circuit 74 can determine that either the wire 51 or the wire 52 connected to the cell 31 is disconnected (DISCONNECTION DETECTION STATE 1). In the disconnection detection state 1, when the cell balance control detecting circuit 340 detects that the difference voltage VDIFF is lower than the cell balance control threshold value VCB, the control circuit 74 determines that the disconnection is dissolved (the connection state between the wire 51 and the wire 52 becomes normal). In this case, the control state of the control circuit 74 transitions to the normal state from the disconnection detection state 1.

Similarly, in the cell balance control state 2, when the disconnection detecting circuit 350 detects that the difference voltage VDIFF exceeds the disconnection detection threshold value VOW, the control circuit 74 can determine that either the wire 52 or the wire 53 connected to the cell 32 is disconnected (DISCONNECTION DETECTION STATE 2). In the disconnection detection state 2, when the cell balance control detecting circuit 340 detects that the difference voltage VDIFF is lower than the cell balance control threshold value VCB, the control circuit 74 determines that the disconnection is dissolved (the connection state between the wire 52 and the wire 53 becomes normal). In this case, the control state of the control circuit 74 transitions to the normal state from the disconnection detection state 2.

In order to be able to conduct the disconnection check at a timing other than the timing of conducting the cell balance control, in the normal state, the control circuit 74 may compare the relationship of the magnitude between the minimum voltage Vmin and a disconnection check threshold value VOWH. Similarly, in order to be able to conduct the disconnection check at timing other than timing of conducting the cell balance control, in the normal state, the control circuit 74 may compare the magnitude relationship between the maximum voltage Vmax and a disconnection check threshold value VOWL. The disconnection check threshold values VOWH and VOWL are voltages set to be higher than the disconnection detection threshold value VOW. The disconnection check threshold value VOWH is a voltage set to be higher than the disconnection check threshold value VOWL.

When the voltage detecting part 73 detects that the minimum voltage Vmin exceeds the disconnection check threshold value VOWH, the control circuit 74 can determine that each cell is charged and the charging state of the secondary battery 30 is approaching the fully charged state. On the other hand, when the voltage detecting part 73 detects that the maximum voltage Vmax is lower than the disconnection check threshold value VOWL, the control circuit 74 can determine that each cell is discharged and the charging state of the secondary battery 30 is approaching the empty state. That is, the control circuit 74 can conduct the disconnection check during charging the secondary battery 30 and during discharging the secondary battery 30. For example, the control circuit 74 conducts, for the cell units in a sequential order, the disconnection check of the wires connected to the respective cells. In other words, the control circuit 74 may check whether the wires for the cells are disconnected, for one cell by one.

In the normal state, when the voltage detecting part 73 detects that the minimum voltage Vmin exceeds the disconnection check threshold value VOWH, the control circuit 74 discharges, for the disconnection check, the cell 31 (DISCONNECTION CHECK STATE 1). Alternatively, in the normal state, when the voltage detecting part 73 detects that the maximum voltage Vmax is lower than the disconnection check threshold value VOWL, the control circuit 74 discharges, for the disconnection check, the cell 31 (DISCONNECTION CHECK STATE 1). In the disconnection check state 1, the control circuit 74 outputs discharge command signal OUT1_CNT for turning the signal level of the OUT1 terminal into the high level to discharge the cell 31.

In the disconnection check state 1, when the disconnection detecting circuit 350 detects that the difference voltage VDIFF exceeds the disconnection detection threshold value VOW, the control circuit 74 can determine that either the wire 51 or the wire 52 connected to the cell 31 is disconnected (DISCONNECTION DETECTION STATE 1). On the other hand, in the disconnection check state 1, when the disconnection detecting circuit 350 detects that the difference voltage VDIFF is lower than the disconnection detection threshold value VOW, the control circuit 74 can determine that both the wire 51 and the wire 52 connected to the cell 31 are not disconnected.

In the disconnection check state 1, when the disconnection detecting circuit 350 detects that the difference voltage VDIFF is lower than the disconnection detection threshold value VOW, the control circuit 74 discharges, for the disconnection check, the cell 32 (DISCONNECTION CHECK STATE 2). In the disconnection check state 2, the control circuit 74 outputs the discharge command signal OUT2_CNT for turning the signal level of the OUT2 terminal into the high level to discharge the cell 32.

In the disconnection check state 2, when the disconnection detecting circuit 350 detects that the difference voltage VDIFF exceeds the disconnection detection threshold value VOW, the control circuit 74 can determine that either the wire 52 or the wire 53 connected to the cell 32 is disconnected (DISCONNECTION DETECTION STATE 2). On the other hand, in the disconnection check state 2, when the disconnection detecting circuit 350 detects that the difference voltage VDIFF is lower than the disconnection detection threshold value VOW, the control circuit 74 can determine that both the wire 52 and the wire 53 connected to the cell 32 are not disconnected.

In the disconnection check state 2, when the disconnection detecting circuit 350 detects that the difference voltage VDIFF is lower than the disconnection detection threshold value VOW, the control circuit 74 discharges, for the disconnection check, the cell 33 (DISCONNECTION CHECK STATE 3). In the disconnection check state 3, the control circuit 74 outputs discharge command signal OUT3_CNT for turning the signal level of the OUT3 terminal into the high level to discharge the cell 33.

In the disconnection check state 3, when the disconnection detecting circuit 350 detects that the difference voltage VDIFF exceeds the disconnection detection threshold value VOW, the control circuit 74 can determine that either the wire 53 or the wire 54 connected to the cell 33 is disconnected (DISCONNECTION DETECTION STATE 3). On the other hand, in the disconnection check state 3, when the disconnection detecting circuit 350 detects that the difference voltage VDIFF is lower than the disconnection detection threshold value VOW, the control circuit 74 can determine that both the wire 53 and the wire 54 connected to the cell 33 are not disconnected.

In the disconnection check state 3, when the disconnection detecting circuit 350 detects that the difference voltage VDIFF is lower than the disconnection detection threshold value VOW, the control state of the control circuit 74 transitions to the normal state from the disconnection check state 3.

Although it is not illustrated in FIG. 7, in the normal state, when the overcharge detection signal OVP (see FIG. 4) is output, the control circuit 74 outputs, from the COUT terminal, the low level signal for turning off the charge control transistor 1. Thereby, regardless of the on/off state of the discharge control transistor 2, it is possible to protect the cells 31 to 33 constituting the secondary battery 30 from overcharging.

Further, although it is not illustrated in FIG. 7, in the normal state, when the over discharge detection signal UVP (see FIG. 4) is output, the control circuit 74 outputs, from the DOUT terminal, the low level signal for turning off the discharge control transistor 2. Thereby, regardless of the on/off state of the charge control transistor 1, it is possible to protect the cells 31 to 33 constituting the secondary battery 30 from over discharging.

In the normal state, when the cell balance control detecting circuit 340 of FIG. 4 detects that the difference voltage VDIFF exceeds the cell balance control threshold value VCB, the control circuit 74 may discharge cells other than the cell specified by the minimum voltage specifying circuit to conduct the cell balance control. For example, when the determination signal Mi1 is at the low level and the determination signals Mi2 and Mi3 are at the high level, the control circuit 74 outputs the discharge command signals OUT2_CNT and OUT3_CNT for turning the signal level of the OUT2 and OUT3 terminals into the high level to discharge the cells 32 and 33. The same applies when the determination signal Mi2 or the determination signal Mi3 is at the low level.

Figure 8:
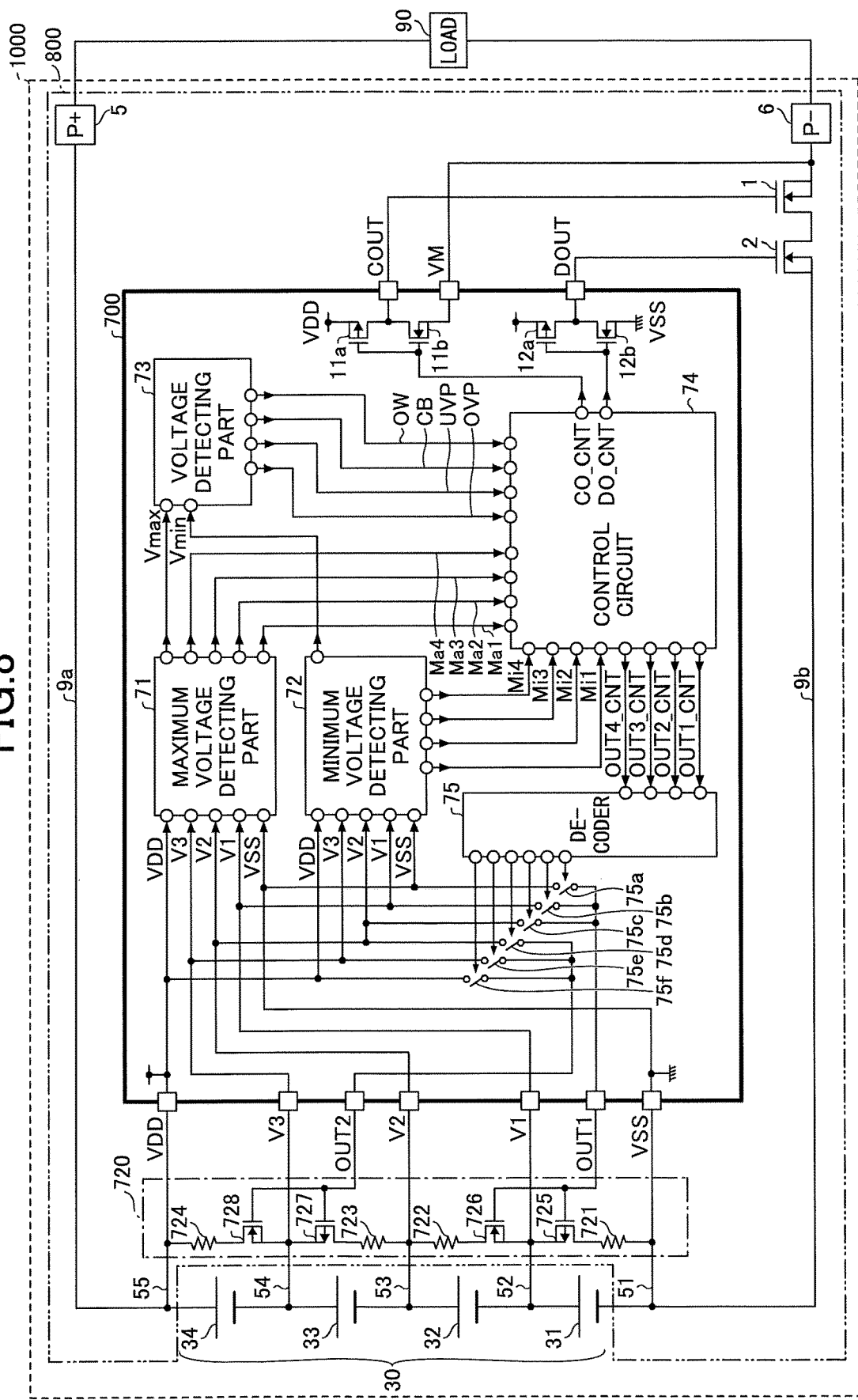
FIG. 8 is a diagram illustrating another example of a configuration of a battery pack.

FIG. 8 is a diagram illustrating another example of a configuration of a battery pack 1000. The battery pack 1000 illustrated in FIG. 8 includes a secondary battery 30 and a battery protecting apparatus 80 that are built in the battery pack 1000. The above descriptions of the battery pack 100 are applied to elements and operations of the configuration of the battery pack 1000 of FIG. 8 similar to those of the battery pack 100 of FIG. 1, and overlapping descriptions are omitted as appropriate. The battery protecting apparatus 800 includes a cell balance circuit 720 and a battery protecting circuit 700.

The cell balance circuit 720 is an example of an equalization circuit that reduces a variation of cell voltages between four cells 31 to 34 included in the secondary battery 30. The cell balance circuit 720 includes four cell balance circuit parts. The first cell balance circuit part is connected in parallel to the cell 31 via the wires 51 and 52. The second cell balance circuit part is connected in parallel to the cell 32 via the wires 52 and 53. The third cell balance circuit part is connected in parallel to the cell 33 via the wires 53 and 54. The fourth cell balance circuit part is connected in parallel to the cell 34 via the wires 54 and 55. The wires 51 to 55 are respectively connected to the VSS terminal, V1 terminal, V2 terminal, V3 terminal, and the VDD terminal.

The first cell balance circuit part causes the cell 31 to discharge in accordance with a command signal from the OUT1 terminal. The second cell balance circuit part causes the cell 32 to discharge in accordance with a command signal from the OUT1 terminal. The third cell balance circuit part causes the cell 33 to discharge in accordance with a command signal from the OUT2 terminal. The fourth cell balance circuit part causes the cell 34 to discharge in accordance with a command signal from the OUT2 terminal. That is, by performing cell balance control for two cells in accordance with command signals from one OUT terminal, the number of output terminals for the cell balance control can be reduced to half the number of cells.

For example, the battery protecting circuit 700 includes a decoder 75 and six switches 75a to 75f.

In a case of receiving, as input, the discharge command signal OUT1_CNT for commanding the cell 31 to discharge, the decoder 75 turns on only the switch 75a of the switches 75a to 75f. Thereby, because the level of the OUT1 terminal is switched to the electric potential of the VSS terminal, a PMOS discharge transistor 725 is turned on and a NOMS discharge transistor 726 is turned off. Accordingly, it is possible to cause the cell 31 to discharge via the discharge resistor 721 and the PMOS discharge transistor 725.

In a case where the discharge command signal OUT1_CNT for commanding the cell 31 to discharge and the discharge command signal OUT2_CNT for commanding the cell 32 to discharge are not input, the decoder 75 turns on only the switch 75b of the switches 75a to 75f. Thereby, because the level of the OUT1 terminal is switched to the electric potential of the VSS terminal, the PMOS discharge transistor 725 is turned off and the NOMS discharge transistor 726 is turned off. Accordingly, it is possible to stop discharging due to the cell balance control of the cells 31 and 32.

In a case of receiving, as input, the discharge command signal OUT2_CNT for commanding the cell 32 to discharge, the decoder 75 turns on only the switch 75c of the switches 75a to 75f. Thereby, because the level of the OUT2 terminal is switched to the electric potential of the V2 terminal, the PMOS discharge transistor 725 is turned off and the NOMS discharge transistor 726 is turned on. Accordingly, it is possible to cause the cell 32 to discharge via the discharge resistor 722 and the NMOS discharge transistor 726.

In a case of receiving, as input, the discharge command signal OUT3_CNT for commanding the cell 33 to discharge, the decoder 75 turns on only the switch 75d of the switches 75a to 75f. Thereby, because the level of the OUT2 terminal is switched to the electric potential of the V2 terminal, a PMOS discharge transistor 727 is turned on and a NOMS discharge transistor 728 is turned off. Accordingly, it is possible to cause the cell 33 to discharge via the discharge resistor 723 and the PMOS discharge transistor 727.

In a case where the discharge command signal OUT3_CNT for commanding the cell 33 to discharge and the discharge command signal OUT4_CNT for commanding the cell 34 to discharge are not input, the decoder 75 turns on only the switch 75e of the switches 75a to 75f. Thereby, because the level of the OUT2 terminal is switched to the electric potential of the V3 terminal, the PMOS discharge transistor 727 is turned off and the NOMS discharge transistor 728 is turned off. Accordingly, it is possible to stop discharging due to the cell balance control of the cells 33 and 34.

In a case of receiving, as input, the discharge command signal OUT4_CNT for commanding the cell 34 to discharge, the decoder 75 turns on only the switch 75f of the switches 75a to 75f. Thereby, because the level of the OUT2 terminal is switched to the electric potential of the VDD terminal, the PMOS discharge transistor 727 is turned off and the NOMS discharge transistor 728 is turned on. Accordingly, it is possible to cause the cell 34 to discharge via the discharge resistor 724 and the NMOS discharge transistor 728.

In this way, one OUT terminal has three values of output level. Thereby, cell balance for two cells can be performed by one OUT terminal.

Figure 9:
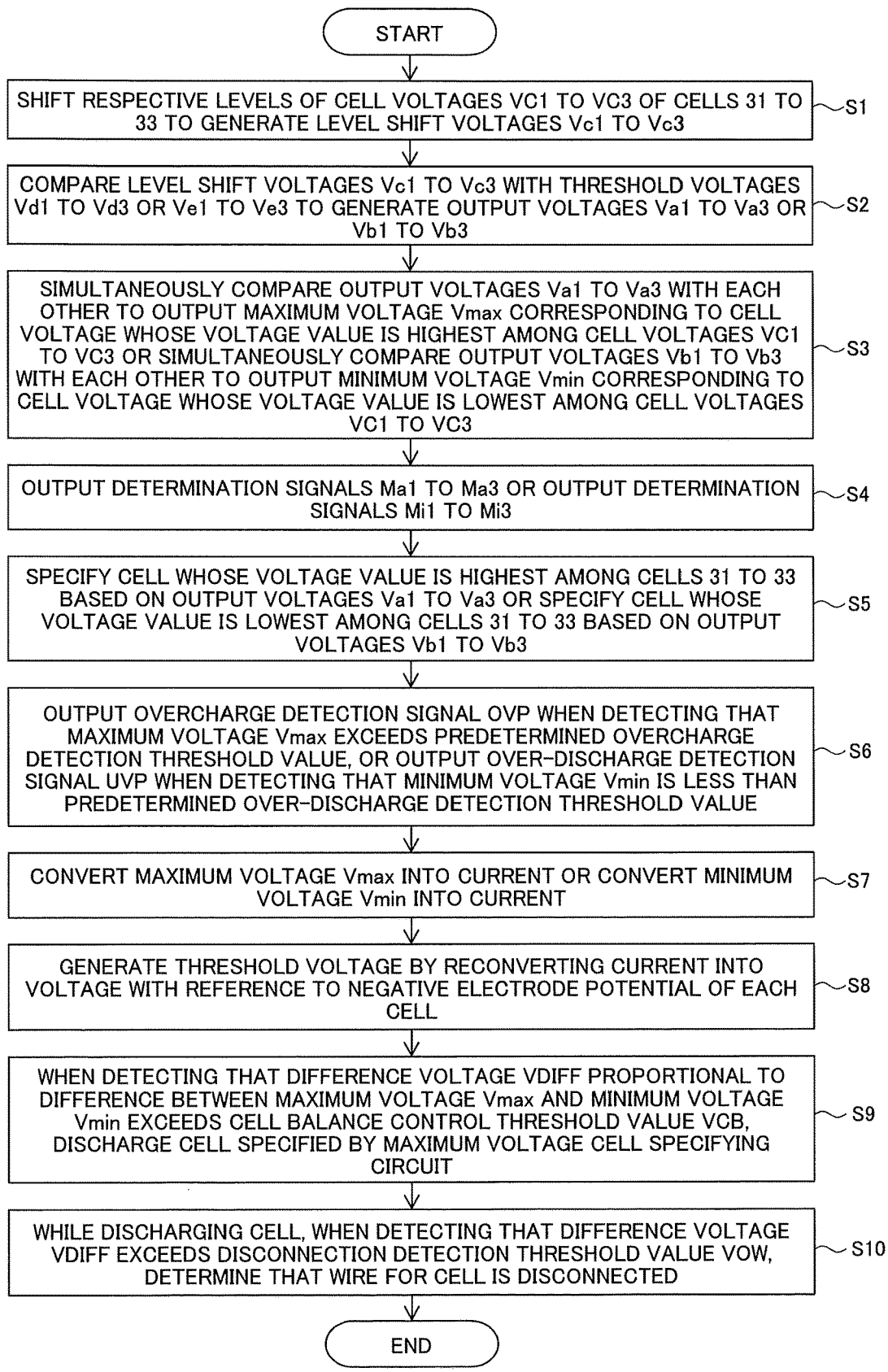
FIG. 9 is a flowchart illustrating an operation according to an embodiment.

An operation according to an embodiment of the present invention will be described with reference to a flowchart illustrated in FIG. 9.

In step S1, the level shift circuit 110 or 210 shift respective levels of cell voltages VC1 to VC3 of the cells 31 to 33 to generate level shift voltages Vc1 to Vc3.

In step S2, the differential amplifier circuits 130 to 150 or 230 to 250 compare the level shift voltages Vc1 to Vc3 with threshold voltages Vd1 to Vd3 or Ve1 to Ve3 to generate output voltages Va1 to Va3 or Vb1 to Vb3-.

In step S3, the maximum voltage output circuit 120 simultaneously compares the output voltages Va1 to Va3 with each other to output the maximum voltage Vmax corresponding to the cell voltage whose voltage value is highest among the cell voltages VC1 to VC3 or the minimum voltage output circuit 220 simultaneously compares the output voltages Vb1 to Vb3 with each other to output the minimum voltage Vmin corresponding to the cell voltage whose voltage value is lowest among the cell voltages VC1 to VC3.

In step S4, the maximum voltage cell specifying circuit 160 outputs determination signals Ma1 to Ma3 or the minimum voltage cell specifying circuit 260 outputs determination signals Mi1 to Mi3.

In step S5, the maximum voltage cell specifying circuit 160 specifies the cell whose voltage value is highest among the cells 31 to 33 based on the output voltages Va1 to Va3 or the minimum voltage cell specifying circuit 260 specifies the cell whose voltage value is lowest among the cells 31 to 33 based on the output voltages Vb1 to Vb3.

In step S6, the overcharge detecting circuit 310 outputs an overcharge detection signal OVP when detecting that the maximum voltage Vmax exceeds a predetermined overcharge detection threshold value, or the over-discharge detecting circuit 320 outputs an over-discharge detection signal UVP when detecting that the minimum voltage Vmin is less than a predetermined over-discharge detection threshold value.

In step S7, the voltage/current converting part 471 converts the maximum voltage Vmax into current or the voltage/current converting part 571 converts the minimum voltage Vmin into current.

In step S8, the threshold voltage is generated by reconverting current into voltage with reference to the negative electrode potential of each cell.

In step S9, when detecting that a difference voltage VDIFF proportional to the difference between the maximum voltage Vmax and the minimum voltage Vmin exceeds a cell balance control threshold value VCB, the control circuit 74 discharges the cell specified by maximum voltage cell specifying circuit.

In step S10, while discharging the cell, when detecting that the difference voltage VDIFF exceeds a disconnection detection threshold value VOW, the control circuit 74 determines that a wire for the cell is disconnected.

Although the preferable embodiments have been described in detail, the present invention is not limited to the above described embodiments, and various modifications, improvements, replacements, and combinations may be applied to the above described embodiments without departing from the scope of the present invention.

For example, any number of cells directed in series may be used to constitute the secondary battery 30. Further, the arranged positions of the transistors 1 and 2 may be replaced with each other with respect to the illustrated positions.

The embodiments are not limited to inserting the transistor 1 for charge control and the transistor 2 for discharge control in the minus side power supply path 9b. The transistor 1 for charge control and the transistor 2 for discharge control may be inserted in the plus side power supply path 9a.

Further, the cell balance circuit may be arranged outside the battery protecting circuit.

What is claimed is:

1. A battery control circuit that is used for a battery protecting apparatus configured to protect a secondary battery in which a plurality of cells are connected in series, the battery control circuit comprising:
a level shift circuit configured to shift respective levels of cell voltages of the plurality of cells to generate a plurality of level shift voltages;
a maximum voltage output circuit including differential amplifier circuits for the plurality of respective level shift voltages, the respective differential amplifier circuits being configured to generate a plurality of output voltages by comparing the plurality of corresponding level shift voltages with a highest voltage among the plurality of output voltages of the respective differential amplifier circuits, the maximum voltage output circuit being configured to output, based on voltages obtained by converting the plurality of output voltages into electric currents and flowing the electric currents to a same load, a maximum voltage corresponding to a cell voltage whose voltage value is highest among the plurality of cell voltages;
an overcharge detecting circuit configured to detect overcharging of the secondary battery based on the maximum voltage; and
a maximum voltage cell specifying circuit configured to specify, based on the plurality of output voltages, a cell whose voltage value is highest among the plurality of cells.

2. The battery control circuit according to claim 1,
wherein the plurality of differential amplifier circuits respectively include output switching elements to which the output voltages are input, and
wherein the plurality of output switching elements are connected in parallel to an output node of the maximum voltage.

3. The battery control circuit according to claim 1, wherein the maximum voltage output circuit is configured to generate the output voltages by converting the maximum voltage into an electric current and reconverting the converted electric current into voltages that are with reference to electric potentials of respective negative electrodes of the plurality of cells.

4. The battery control circuit according to claim 1, further comprising:
a control circuit configured to cause the cell, specified by the maximum voltage cell specifying circuit, to discharge.

5. The battery control circuit according to claim 1,
wherein the level shift circuit includes for the plurality of respective cells, a plurality of level shift circuit parts in each of which a level shift element, whose input part is connected to a positive electrode of a cell, and a constant current source, connected between an output part of the level shift element and a common ground, are connected in series, and
wherein the plurality of respective level shift circuit parts output, from their output parts, the level shift voltages that are lower than the cell voltages of the plurality of corresponding cells.

6. A battery control circuit that is used for a battery protecting apparatus configured to protect a secondary battery in which a plurality of cells are connected in series, the battery control circuit comprising:
a level shift circuit configured to shift respective levels of cell voltages of the plurality of cells to generate a plurality of level shift voltages;
a minimum voltage output circuit including differential amplifier circuits for the plurality of respective level shift voltages, the respective differential amplifier circuits being configured to generate a plurality of output voltages by comparing the plurality of corresponding level shift voltages with a lowest voltage among the plurality of output voltages of the respective differential amplifier circuits, the minimum voltage output circuit being configured to output, based on voltages obtained by converting the plurality of output voltages into electric currents and flowing the electric currents to a same load, a minimum voltage corresponding to a cell voltage whose voltage value is lowest among the plurality of cell voltages;
an over-discharge detecting circuit configured to detect over-discharging of the secondary battery based on the minimum voltage; and
a minimum voltage cell specifying circuit configured to specify, based on the plurality of output voltages, a cell whose voltage value is lowest among the plurality of cells.

7. The battery control circuit according to claim 6,
wherein the plurality of differential amplifier circuits respectively include output switching elements to which the output voltages are input, and
wherein the plurality of output switching elements are connected in parallel to an output node of the minimum voltage.

8. The battery control circuit according to claim 6, wherein the minimum voltage output circuit is configured to generate the output voltages by converting the minimum voltage into an electric current and reconverting the converted electric current into voltages that are with reference to electric potentials of respective negative electrodes of the plurality of cells.

9. A battery control circuit that is used for a battery protecting apparatus configured to protect a secondary battery in which a plurality of cells are connected in series, the battery control circuit comprising:
a level shift circuit configured to shift respective levels of cell voltages of the plurality of cells to generate a plurality of level shift voltages;
a maximum voltage output circuit including differential amplifier circuits for the plurality of respective level shift voltages, the respective differential amplifier circuits being configured to generate a plurality of first output voltages by comparing the plurality of corresponding level shift voltages with a highest voltage among the plurality of first output voltages of the respective differential amplifier circuits, the maximum voltage output circuit being configured to output, based on first voltages obtained by converting the plurality of first output voltages into first electric currents and flowing the first electric currents to a first same load, a maximum voltage corresponding to a cell voltage whose voltage value is highest among the plurality of cell voltages;
a maximum voltage cell specifying circuit configured to specify, based on the plurality of first output voltages, a cell whose voltage value is highest among the plurality of cells; and
a minimum voltage output circuit including differential amplifier circuits for the plurality of respective level shift voltages, the respective differential amplifier circuits being configured to generate a plurality of second output voltages by comparing the plurality of corresponding level shift voltages with a lowest voltage among the plurality of second output voltages of the respective differential amplifier circuits, the minimum voltage output circuit being configured to output, based on second voltages obtained by converting the plurality of second output voltages into second electric currents and flowing the second electric currents to a second same load, a minimum voltage corresponding to a cell voltage whose voltage value is lowest among the plurality of cell voltages.

10. The battery control circuit according to claim 9, further comprising:
a disconnection detecting circuit configured to detect whether a difference between the maximum voltage and the minimum voltage exceeds a predetermined disconnection detection threshold value; and
a control circuit configured to determine that a wire connected to one cell of the plurality of cells is disconnected when the disconnection detecting circuit detects that the difference exceeds the disconnection detection threshold value in a state of commanding the one cell to discharge.

11. The battery control circuit according to claim 10, wherein the one cell is the cell specified by the maximum voltage cell specifying circuit.

12. The battery control circuit according to claim 9, further comprising:
a cell balance control detecting circuit configured to detect whether a difference between the maximum voltage and the minimum voltage exceeds a predetermined cell balance control threshold value; and a control circuit configured to cause the cell, specified by the maximum voltage cell specifying circuit, to discharge when the cell balance control detecting circuit detects that the difference exceeds the cell balance control threshold value.

13. The battery control circuit according to claim 12, further comprising:

a disconnection detecting circuit configured to detect whether the difference between the maximum voltage and the minimum voltage exceeds a disconnection detection threshold value that is higher than the cell balance control threshold value, wherein the control circuit determines that a wire connected to the cell specified by the maximum voltage cell specifying circuit is disconnected when the disconnection detecting circuit detects that the difference exceeds the disconnection detection threshold value in a state of commanding the cell, specified by the maximum voltage cell specifying circuit, to discharge.

* * * * *